US006556784B2

(12) United States Patent
Onuki

(10) Patent No.: US 6,556,784 B2
(45) Date of Patent: *Apr. 29, 2003

(54) IMAGE RECORDING/REPRODUCING SYSTEM, IMAGE RECORDING APPARATUS, AND IMAGE REPRODUCING APPARATUS

(75) Inventor: Ichiro Onuki, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,619

(22) Filed: Dec. 20, 1999

(65) Prior Publication Data
US 2001/0038748 A1 Nov. 8, 2001

(30) Foreign Application Priority Data

Dec. 25, 1998 (JP) .............................. 10-369919

(51) Int. Cl.⁷ ........................... G03B 7/097; G03B 17/24
(52) U.S. Cl. .......................... 396/52; 396/243; 396/311
(58) Field of Search .......................... 396/52, 53, 243, 396/311, 310, 429

(56) References Cited

U.S. PATENT DOCUMENTS 6,205,296 B1 * 3/2001 Hamada et al. ............. 396/311
6,263,167 B1 * 7/2001 Kamata et al. ............. 396/311
6,273,535 B1 * 8/2001 Inoue et al. .................. 347/3

* cited by examiner

Primary Examiner—W. B. Perkey
(74) Attorney, Agent, or Firm—Robin, Blecker & Daley

(57) ABSTRACT

An image recording/reproducing system which includes an image recording apparatus for recording an image on a recording medium and an image reproducing apparatus for reproducing the image by using the image recording medium having the image recorded by the image recording apparatus. The image recording apparatus is provided with a photo-taking mode selecting part for selecting a photo-taking mode, a photo-taking condition setting part for setting a predetermined photo-taking condition in accordance with the photo-taking mode set by the photo-taking mode selecting part, and a photo-taking mode recording part for recording, on the recording medium, information of the selected photo-taking mode. The image reproducing apparatus is provided with an image processing part for performing processing to vary the image on the basis of the photo-taking mode information recorded on the recording medium.

36 Claims, 21 Drawing Sheets

| 1/2 | 1/2 | 1/2 | 1/2 | 1/2 | 1/2 | 1/2 | 1/2 |
|-----|-----|-----|-----|-----|-----|-----|-----|
| 1/2 | 1   | 1   | 1   | 1   | 1   | 1   | 1/2 |
| 1/2 | 1/2 | 1/2 | 1/2 | 1/2 | 1/2 | 1/2 | 1/2 |

| | | | | |
|---|---|---|---|---|
| SL1 | SL2 | SL3 | SL4 | SL5 |
| SL6 | SL7 | SL8 | SL9 | SL10 |
| SL11 | SL12 | SL13 | SL14 | SL15 |
| SL16 | SL17 | SL18 | SL19 | SL20 |
| SL21 | SL22 | SL23 | SL24 | SL25 |

256, 257, 258

| 0 | 0 | 0 | 1/2 | 0 | 0 | 0 |
|---|---|---|---|---|---|---|
| 0 | 0 | 1/2 | 1 | 1/2 | 0 | 0 |
| 0 | 1/2 | 1 | 1 | 1 | 1/2 | 0 |
| 1/2 | 1 | 1 | 1 | 1 | 1 | 1/2 |
| 0 | 1/2 | 1 | 1 | 1 | 1/2 | 0 |
| 0 | 0 | 1/2 | 1 | 1/2 | 0 | 0 |
| 0 | 0 | 0 | 1/2 | 0 | 0 | 0 |

IMAGE RECORDING/REPRODUCING SYSTEM, IMAGE RECORDING APPARATUS, AND IMAGE REPRODUCING APPARATUS

BACKGROUND OF THE INVENTION

1. Field of the Invention

The present invention relates to an image recording/reproducing system including an image recording apparatus for acquiring an image in a particular fashion intended by the photographer (an image conforming to a picture-drawing intention) and also including an image reproducing apparatus for reproducing the image acquired by the image recording apparatus after processing the image in a desired fashion.

2. Description of Related Art

Heretofore, such a technique has been proposed for easily obtaining an image conforming to a picture-drawing intention of the photographer, such as a flowing shooting or a portrait shooting.

For example, in a camera disclosed in Japanese Laid-Open Patent Application No. Sho 58-198031 (corresponding to U.S. Pat. No. 4,536,074), a plurality of icons indicative of various picture-drawing intentions are displayed on a display device of the camera, so that when the photographer selects a desired icon among the plurality of icons, an aperture value and a shutter speed which are adapted for attaining a predetermined picture-drawing effect corresponding to the desired icon are automatically determined by the camera.

In this known technique, if the photographer selects an icon corresponding to the flowing shooting, the camera sets a shutter speed considered to be adapted for attaining a flowing shooting effect, and then calculates a correct aperture value from the shutter speed, the sensitivity of a film and the luminance of an object, thereby determining an exposure condition.

Further, in Japanese Laid-Open Patent Application No. Hei 5-232562, there is disclosed a camera which determines whether or not the camera is in the flowing shooting state on the basis of the output of an angular velocity sensor incorporated in the camera. In this camera, if it is determined that the camera is in the flowing shooting state, in accordance with the output of the angular velocity sensor and the focal length information of a photo-taking lens, the shutter speed is automatically set to a value which is adapted for attaining the flowing shooting effect.

Also, in Japanese Laid-Open Patent Application No. Hei 8-43870, there is disclosed a camera having the function of camera-shake correction (the image-stabilizing function), in which, while a camera-shake correction in a particular direction is made operative, a camera-shake correction in a direction perpendicular to the particular direction is made inoperative, thereby achieving the compatibility between the camera-shake correction and the flowing shooting effect.

In addition, in Japanese Laid-Open Patent Application No. Sho 62-32577 (corresponding to U.S. patent application Ser. No. 08/321,019 filed on Oct. 6, 1994), there is disclosed a technique of processing a photographed picture by using an image processing parameter which was set when the picture was taken, thereby achieving a particular effect such as a cross screen filtering effect by means of image processing.

However, almost all cameras according to any known technique described above are designed to achieve an image in a desired fashion by selecting a proper exposure condition when a picture is taken, and, when an image is reproduced, any known technique does not perform a process to obtain a high-quality image in a particular fashion in which the intention of the photographer is correctly reflected.

In the technique according to the above-mentioned Japanese Laid-Open Patent Application No. Hei 5-232562, when an object moves at a low speed, a flowing shooting effect may be produced for a background image by selecting a low shutter speed. However, there is the possibility that the low shutter speed causes the camera-shake or the degradation in picture quality for a main object.

Further, in a reproducing apparatus for reproducing an image according to any conventional technique, a special effect technique is merely used in the stage of reproduction of an image, so that a problem arises in that an original picture-taking intention of the photographer cannot be appropriately realized.

More specifically, in the above-mentioned Japanese Laid-Open Patent Application No. Sho 62-32577 (corresponding to U.S. patent application Ser. No. 08/321,019 filed on Oct. 6, 1994), any technique for easily separating a main object from a background on an image is not disclosed, and, therefore, it is not possible to perform a particular process on only one of a main object and a background as is required to achieve a flowing shooting effect, although it is possible to perform a process over the entire image as is the case with a cross screen filtering.

BRIEF SUMMARY OF THE INVENTION

In accordance with one aspect of the invention, there is provided an image recording/reproducing system comprising recording means for setting a predetermined photo-taking condition according to selection of a photo-taking mode and recording an image on a recording medium in the photo-taking condition and for also recording information of the selected photo-taking mode on the recording medium, and image processing means for performing a process of varying the image on the basis of the photo-taking mode information recorded on the recording medium, so that it is possible to, at the time of a photo-taking operation, perform the photo-taking operation in such a photo-taking condition as to attain an effect conforming to a picture-drawing intention, and it is possible to, also at the time of an image reproducing operation, perform such an image processing as to emphasize the picture-drawing intention.

The above and further aspects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

First Embodiment

FIGS. 1 to 16 illustrate a first embodiment of the invention.

Figure 1:
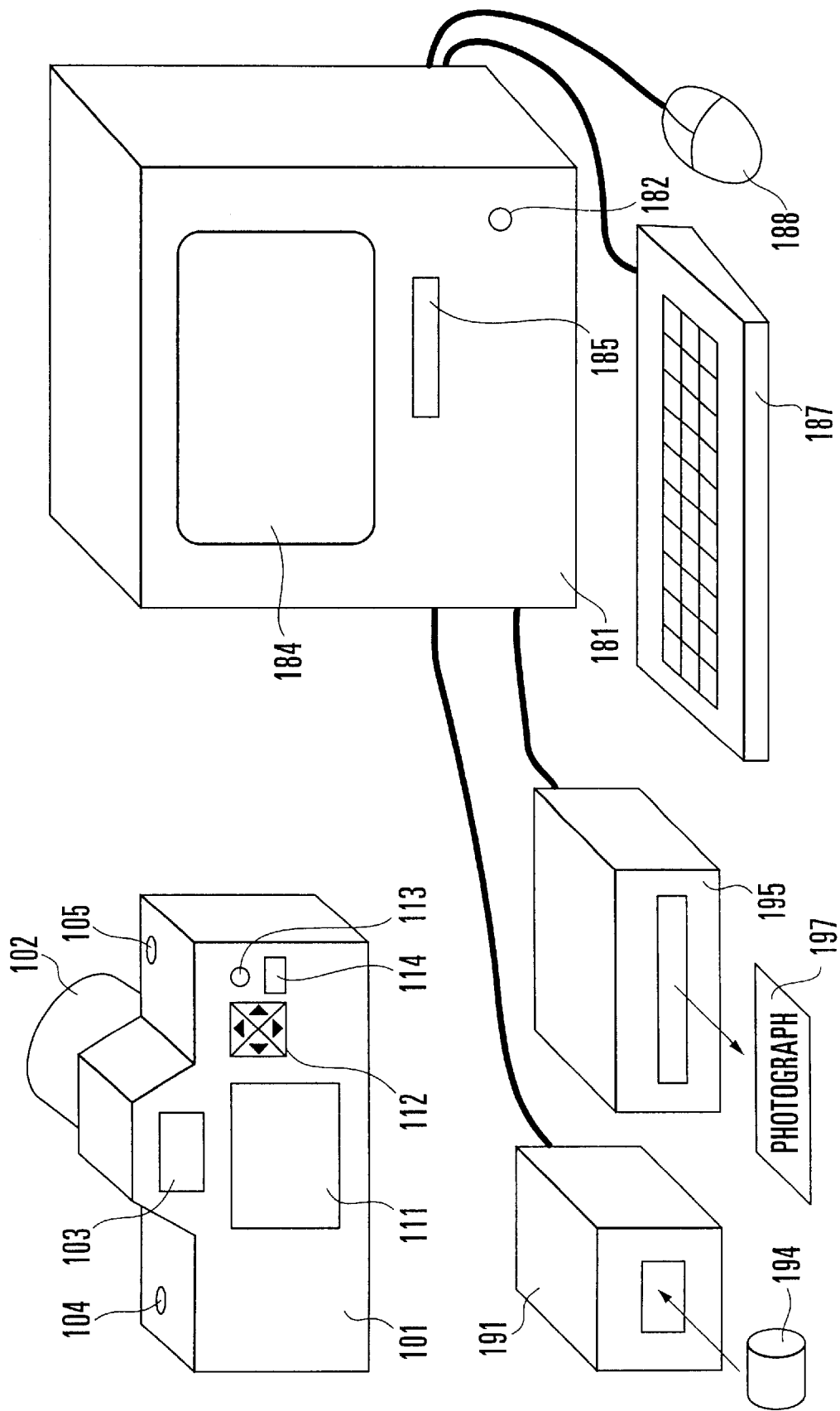
FIG. 1 is a schematic diagram illustrating an image recording/reproducing system according to a first embodiment of the invention.

FIG. 1 is a perspective view schematically illustrating the construction of an image recording/reproducing system including an image recording apparatus and an image reproducing apparatus according to the first embodiment of the invention.

In FIG. 1, reference numeral 101 denotes a camera, serving as the image recording apparatus, capable of recording an image of an object together with photo-taking information on a film disposed in the camera 101. The camera 101 includes a photo-taking lens 102, a viewfinder eyepiece part 103, a main switch 104 serving as a power supply switch, and a release button 105.

On the back side of the camera 101, there are disposed a display means 111, such as a liquid crystal panel or the like, a scroll button 112, a mode selection button 113, and a selection confirmation button 114.

Reference numeral 181 denotes a body of the image reproducing apparatus for performing a predetermined process on an image in the form of a digital signal. The image reproducing apparatus body 181 includes a power supply switch 182, a display means 184, such as a CRT or the like, and a PC card drive 185. Further, to the image reproducing apparatus body 181, there are connected a keyboard 187 and a mouse 188.

Reference numeral 191 denotes a film scanner used to read an image recorded on a film placed in a film cartridge 194.

Reference numeral 195 denotes a printer for producing a photograph 197 by printing a hard copy in accordance with a digital image signal supplied from the image reproducing apparatus body 181.

Figure 2:
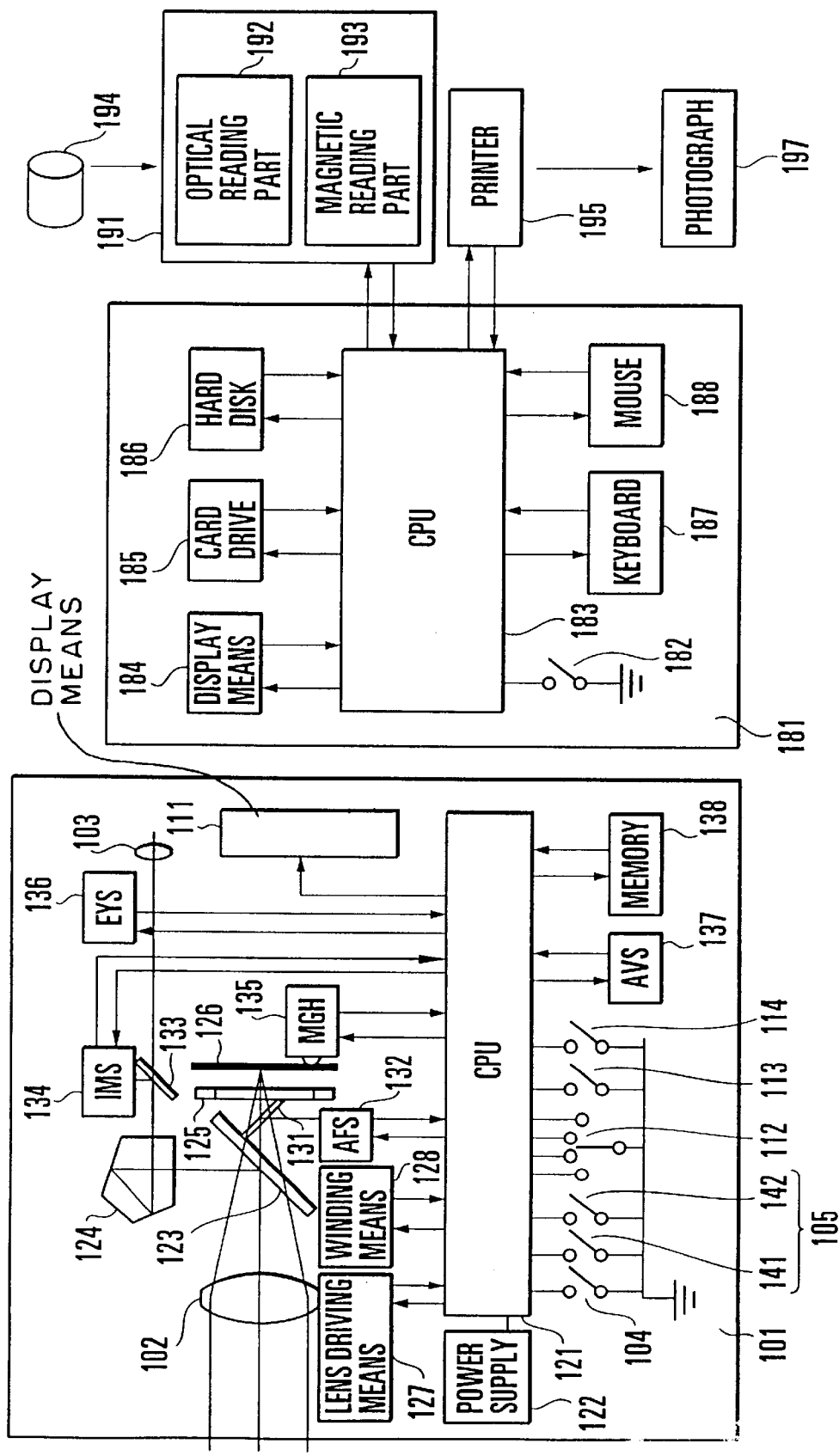
FIG. 2 is a schematic diagram illustrating the details of the image recording/reproducing system according to the first embodiment of the invention.

FIG. 2 illustrates the details of the arrangement of the camera serving as the image recording apparatus and the arrangement of the image reproducing apparatus.

First, the arrangement of the camera 101 is described.

A CPU 121 in the form of a one-chip microcomputer is responsible for controlling the operation over the entire camera 101 and includes a ROM, a RAM, an EEPROM, an A/D converter and a D/A converter. A power supply 122 supplies electric power to various circuits and actuators inside the camera 101.

A light flux from an object (an object to be photographed) passes through the photo-taking lens 102, a semi-transparent quick-return mirror 123, a pentagonal roof prism 124, and an eyepiece part 103 and finally forms a viewfinder image which can be viewed by the photographer. When a photo-taking operation is performed, the quick-return mirror 123 is caused to retreat upward, and an object image is formed on a film 126 serving as an image recording medium while the exposure time is controlled by a focal plane shutter 125.

The film 126 is formed of a base material coated with a layer composed of a mixture of a photosensitive emulsion and a magnetic medium. An object image is optically recorded on the film 126, and information on a photo-taking condition is magnetically recorded on the film 126. A lens driving means 127 serves to drive the photo-taking lens 102 for the purpose of focusing and also serves to drive a diaphragm (not shown). A winding means 128 serves to mechanically charge the quick-return mirror 123 and the focal plane shutter 125 and also serves to wind and rewind the film 126.

A sub-mirror 131 is disposed behind the quick-return mirror 123. A light flux which has passed through the quick-return mirror 123 is reflected downward by the sub-mirror 131 and is made incident on a focus detecting unit 132 including a focus detecting sensor. A focus detecting device disclosed, for example, in Japanese Laid-Open Patent Application No. Hei 10-104504 may be employed as the focus detecting unit 132. The focus detecting device is capable of detecting focus information over a two-dimensional area in an imaging plane, that is, capable of detecting three-dimensional information about a field of view.

A half-reflection mirror 133 is disposed in a viewfinder optical path. The viewfinder light flux is partially reflected upward by the half-reflection mirror 133 and is made to pass through a re-imaging lens (not shown), thereby re-imaging an object image on an image sensor 134. The image sensor 134 is a color area sensor composed of, for example, a CCD for producing information corresponding to the object image and transmitting the resultant information to the CPU 121.

A magnetic signal recording means 135 is disposed such that its magnetic head is in contact with the film 126 so as to magnetically record photo-taking information on the magnetic medium coated on the film 126.

A visual-line detecting sensor 136 is disposed near the eyepiece part 103 so as to detect a visual line direction of the photographer, that is, a direction in which the photographer is viewing in the viewfinder image. A device disclosed, for example, in Japanese Laid-Open Patent Application No. Hei 5-107454 may be employed as the visual-line detecting sensor 136.

An angular velocity meter 137 serves to detect a movement of the camera caused by the vibration of the hand of the photographer or a panning operation performed during the flowing shooting process. The angular velocity meter 137 may be realized using, for example, a vibration gyroscope.

A memory 138 is used to store photo-taking information. The memory 138 is also used when an image signal detected by various sensors in the camera is processed. An EEPROM, a flash memory, a magnetic disk, an optical disk or the like may be employed as the memory 138.

When the main switch 104 is turned on by the photographer, the CPU 121 is activated from a sleep state into an active state so as to execute a predetermined program for performing a photo-taking process.

A photo-taking preparation switch (SW1) 141 is arranged to begin the execution of a photo-taking preparation operation such as light measurement, focus adjustment, etc. A photo-taking switch (SW2) 142 is arranged to start an exposure operation onto the film 126. These switches 141 and 142 are mechanically interlocked with the above-described release button 105. When the release button 105 is pressed into a half-pressed position, the switch SW1 is turned on, so that the photo-taking preparation operation is performed. When the release button 105 is further pressed into a full-pressed position, the switch SW2 is turned on, so that the photo-taking operation is started.

A scroll switch group is interlocked with the scroll button 112 and includes four switching contacts disposed under the scroll button 112. This scroll button 112 is used to select or change various functions of the camera or data as will be described in detail later.

A mode selection button 113 is used to select various operation modes of the camera. Information indicative of a selected operation mode is displayed on the display means 111 described earlier. The selection confirmation button 114 is used to finally determine a selected function.

The arrangement of the image reproducing apparatus body 181 is described below.

A CPU 183 is a control device including a ROM, a RAM, an EEPROM, an A/D converter and a D/A converter and is responsible for controlling operations over the entire image reproducing apparatus. A display means 184 is composed of a CRT, a liquid crystal monitor, a plasma display, or the like, and serves to display states of the image reproducing apparatus body 181 and peripheral devices connected thereto and also display an image or data given as a result of execution of various control programs.

A card drive 185 serves to transmit and receive data to and from a PC card (not shown). A hard disk 186 serves to store an image processing program which will be described later and also store various types of data such as image data. Reference numeral 182 denotes a power supply switch. If the power supply switch 182 is turned on, execution of various control programs is started.

Reference numerals 187 and 188 respectively denote a keyboard and a mouse for inputting data.

Reference numeral 191 denotes a film scanner including an optical reading part 192 and a magnetic reading part 193. If a film cartridge 194 containing a film, which has been exposed by the camera 101 and developed by a developing machine (not shown), is loaded on the film scanner 191, the optical reading part 192 reads image information from the film and produces a digital image signal corresponding to the image information, and the magnetic reading part 193 reads photo-taking information recorded on the magnetic layer of the film. The film scanner 191 performs the film scanning operation under the control of the image reproducing apparatus body 181, and the thus-read image signal and photo-taking information are transferred to the image reproducing apparatus body 181.

A printer 195 receives a digital image signal processed by the image reproducing apparatus body 181 and outputs a photograph 197 in the form of a hard copy. As for the printer 195, various types of printers such as a silver-halide printer which forms an image by exposing silver-halide photographic paper to three primary color laser beams, a sublimation type printer, an inkjet printer, or an electrophotographic laser beam printer may be employed.

Figure 3:
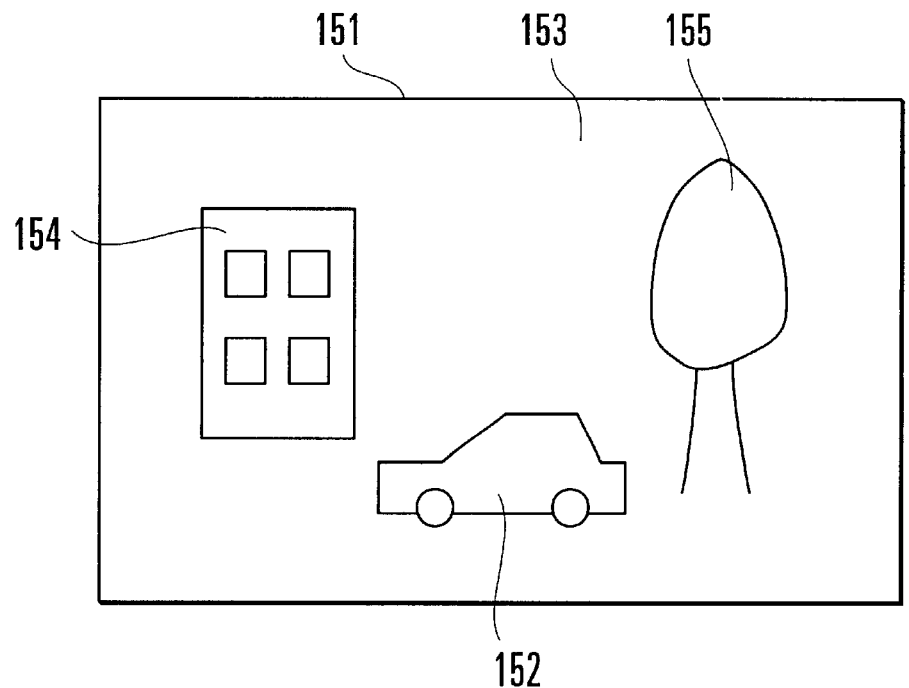
FIG. 3 shows an example of a scene which may be photographed in an advantageous fashion according to the first embodiment of the invention.

FIG. 3 illustrates a scene which may be advantageously photographed in the flowing shooting mode. An image on a photo-taking image plane 151 includes a running car 152 to be photographed as a main object, a background 153, a building 154 which is a part of the background 153, and a tree 155 which is also a part of the background 153. The image shown in FIG. 3 is assumed to be photographed in a normal program AE mode. In this case, when the object luminance is high, the shutter speed becomes high, so that both the main object 152 and the background (153–155) are photographed in a still state and a flowing shooting effect is not attained.

Figure 4:
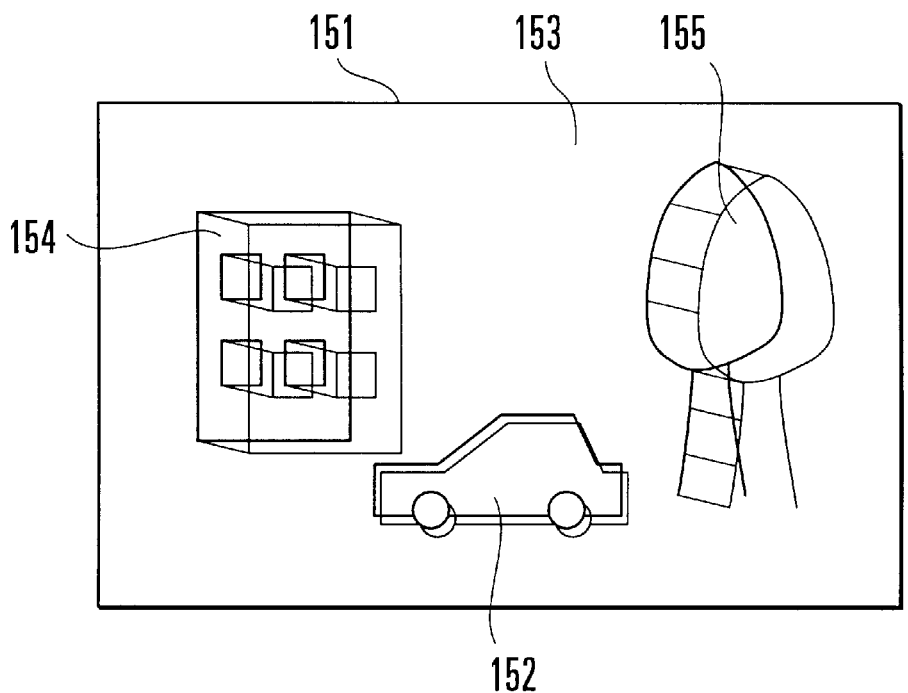
FIG. 4 shows an example of a picture taken in a normal photo-taking mode using a camera serving as an image recording apparatus according to the first embodiment of the invention.

FIG. 4 illustrates an image obtained by photographing the scene shown in FIG. 3 in a shutter priority AE mode. Generally, in the shutter priority AE mode, the photographer sets, by his or her own decision, the shutter speed to a value which allows a flowing shooting effect to occur, and performs a photo-taking operation in the shutter priority mode using the set shutter speed. Then, a lower shutter speed is selected in order to sufficiently attain the flowing shooting effect. In this instance, however, although the background (153–155) is photographed in a flowing state, there is the possibility that the main object 152 is photographed in a blurred state due to the camera-shake.

According to the first embodiment of the invention, there is provided a camera which allows any photographer, even a beginner, to easily obtain a picture having a flowing shooting effect without resulting in a failure of the flowing shooting.

Figure 5:
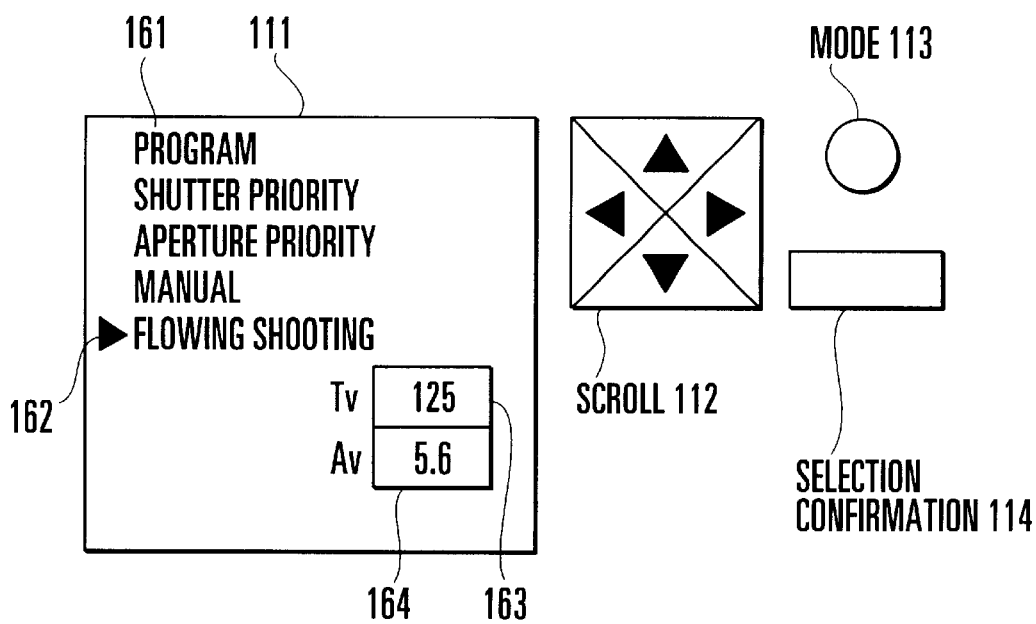
FIG. 5 is a schematic diagram illustrating an initial picture on a display means of the camera serving as the image recording apparatus according to the first embodiment of the invention.

FIG. 5 is a schematic diagram illustrating an initial picture on the display means 111 of the camera 101 according to the first embodiment of the invention. In FIG. 5, the display means 111 and various operation members disposed on the back side of the camera 101 are shown for the situation in which the main switch 104 of the camera 101 is turned on, thereby supplying electric power of the camera 101. The initial picture on the display means 111 includes a camera operation mode display part 161, a photo-taking mode selection pointer 162, a shutter speed display part 163 and an aperture value display part 164.

Figure 6:
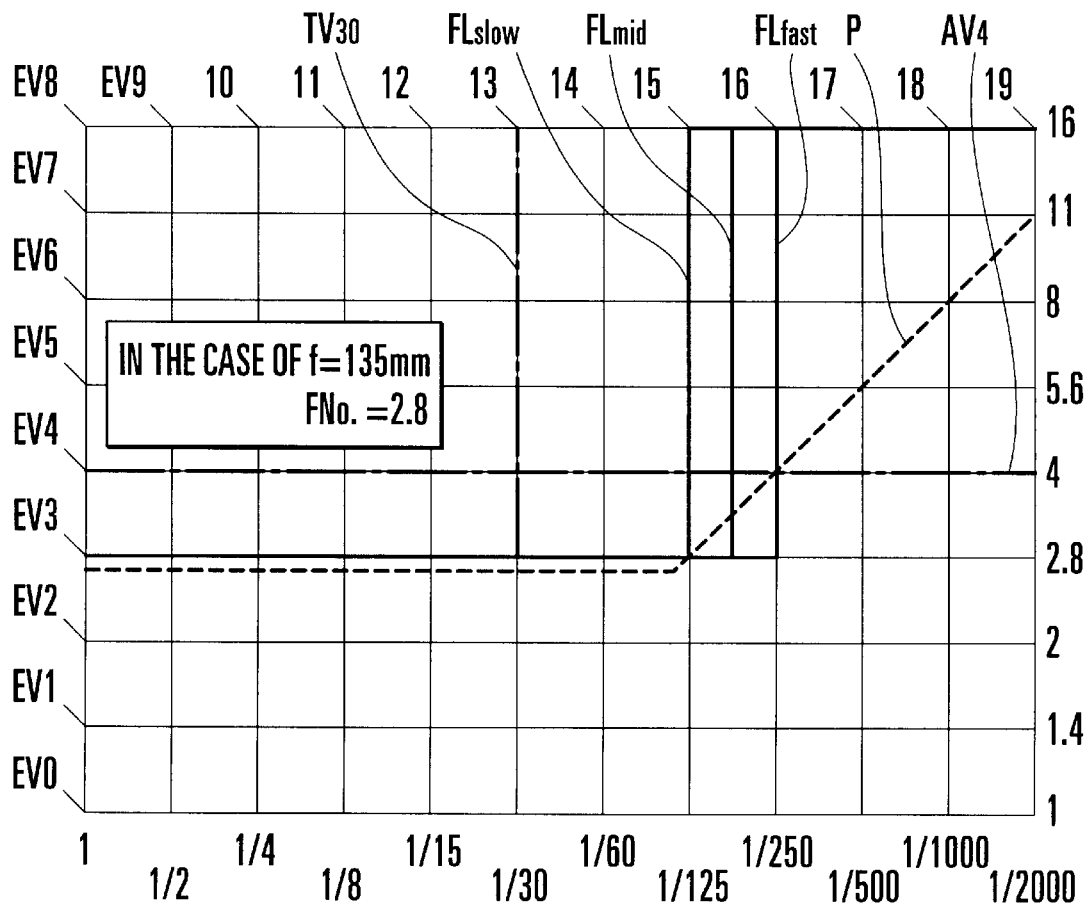
FIG. 6 is a graph illustrating exposure control program lines employed by the camera serving as the image recording apparatus according to the first embodiment of the invention.

FIG. 6 illustrates a program line diagram, according to which the camera 101 controls an exposure. Referring to FIGS. 5 and 6, various photo-taking modes are described below.

In FIG. 5, "PROGRAM" denotes a program AE mode. In the program AE mode, an exposure is performed at the combination of a shutter speed and an aperture value which are selected from values plotted on line P in an EV plane shown in FIG. 6.

In FIG. 5, "SHUTTER PRIORITY" denotes a shutter priority AE mode. In FIG. 6, "TV30" denotes a line for the condition where the shutter speed is set to 1/30 sec in the shutter priority AE mode. In FIG. 5, "APERTURE PRIORITY" denotes an aperture priority AE mode. In FIG. 6, "AV4" denotes a line for the aperture priority AE mode for the case where the aperture value is set to F4.0. In FIG. 5, "MANUAL" denotes a manual exposure mode in which a shutter speed and an aperture value are manually selected by the photographer. In FIG. 5, "FLOWING SHOOTING" denotes the flowing shooting mode which is peculiar to the first embodiment of the invention. If the flowing shooting mode is selected by the photographer, a line denoted by "FLslow", "FLmid" or a"FLfast" in FIG. 6 is selected depending on the photo-taking condition, as will be described in detail later.

Figure 7:
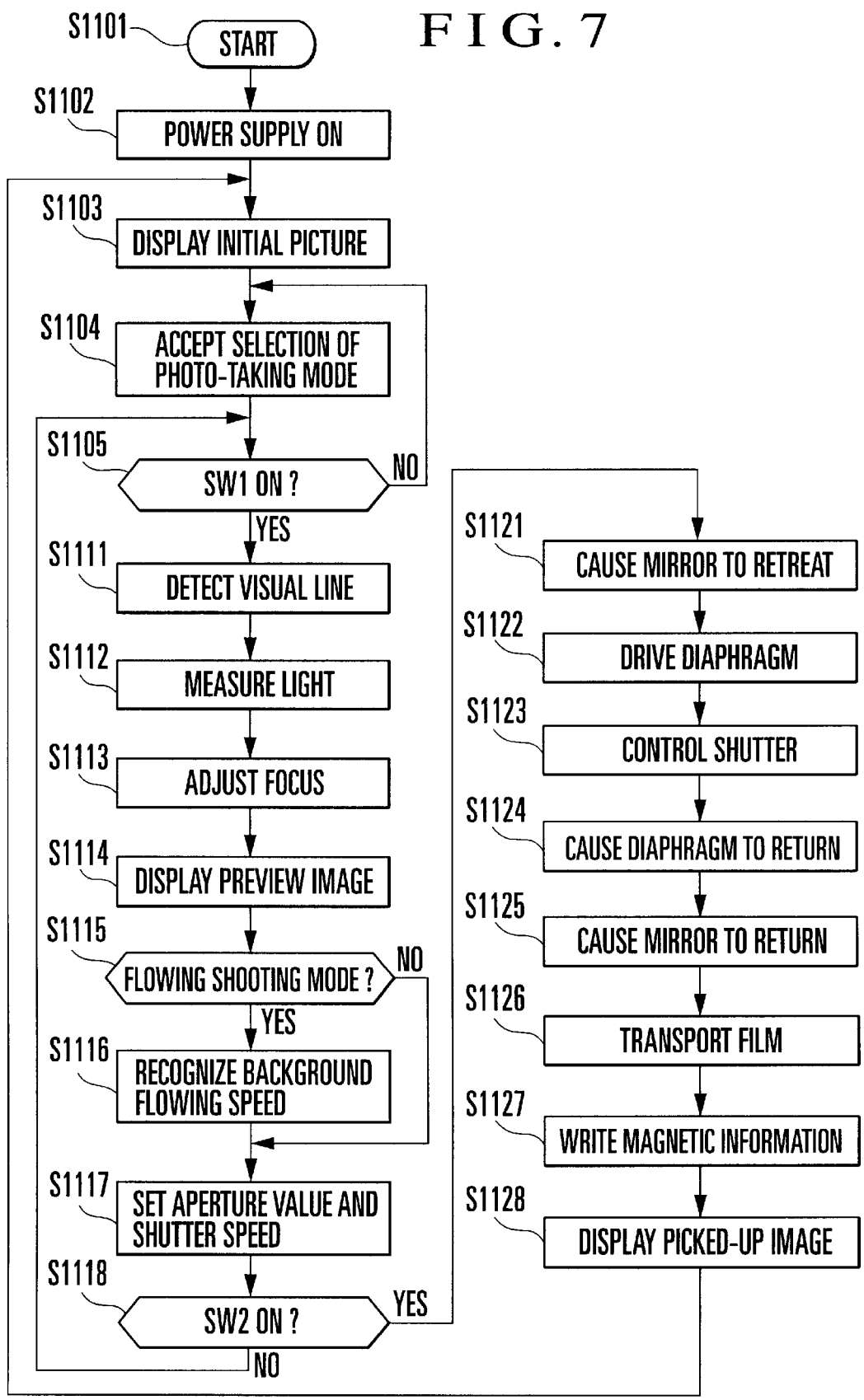
FIG. 7 is a control flow chart associated with a phototaking process performed by the camera serving as the image recording apparatus according to the first embodiment of the invention.

FIG. 7 is a flow chart illustrating a control flow associated with a photo-taking operation of the camera described above with reference to FIGS. 1 and 2. Referring to the flow chart shown in FIG. 7 in conjunction with FIGS. 1 to 6, the photo-taking operation of the camera is described below.

If, in steps S1101 and S1102, the main switch 104 of the camera 101 shown in FIG. 1 is turned on by the photographer, the CPU 121 of the camera 101 is activated from a sleep state into an active state, and electric power is supplied to various circuits in the camera, thereby allowing the photo-taking operation to be started. Then, in step S1103, an initial picture is displayed on the display means 111, as shown in FIG. 5.

In step S1104, the photographer is allowed to select a photo-taking mode. If the photographer presses the mode selection button 113, available photo-taking modes are displayed on the display means 111, as shown in FIG. 5. Then, the photographer is allowed to select a desired photo-taking mode by pressing an up-scroll button part or a down-scroll button part of the scroll button 112. The selected photo-taking mode is indicated by the selection pointer 162. In the example shown in FIG. 5, such an indication is made that the flowing shooting mode has been selected.

In the next step S1105 in FIG. 7, it is determined whether or not the photo-taking preparation switch 141 (SW1) interlocked with the release button 105 is turned on. If the switch 141 is turned on, the process proceeds to step S1111. On the other hand, if the switch 141 is not turned on, the process returns to step S1104 to wait until a photo-taking mode is selected.

In the case where it is determined in step S1105 that the switch 141 is turned on, the process proceeds to step S1111 to detect the direction of a visual line of the photographer by means of the visual-line detecting sensor 136.

In step S1112, light measurement is performed by calculating the object luminance from an object signal obtained by the image sensor 134 shown in FIG. 2.

In step S1113, a focus adjustment is performed as described below. First, a known correlation arithmetic operation is performed on the image signal obtained by the focus detecting unit 132 so as to obtain three-dimensional information of a field of view (an area to be photographed). Subsequently, the location of a main object in the phototaking image plane is then estimated from this three-dimensional information and the visual-line information obtained in step S1111. The lens driving means 127 is then driven in accordance with the amount of defocus of the main object so as to perform the focus adjustment.

In step S1114, the image acquired by the image sensor 134, that is, an image called a preview image, is displayed on the display means 111, so that the photographer can predict what photograph will be taken.

In step S1115, the photo-taking mode selected in step S1104 is determined. In the case where a photo-taking mode other than the flowing shooting mode is selected, the process jumps to step S1117 to determine a shutter speed and an aperture value in accordance with a predetermined exposure control diagram shown in FIG. 6. If it is determined in step S1115 that the flowing shooting mode is selected as the photo-taking mode, the process proceeds to step S1116 to recognize the image flowing speed V (unit: mm/sec) on the photo-taking image plane.

More specifically, the image flowing speed V is determined by calculating "V=ω×f", which is the product of the output ω (unit: rad/sec) of the angular velocity meter 137 shown in FIG. 2 and the focal length f (unit: mm) of the photo-taking lens 102.

In the next step S1117, the shutter speed and the aperture value are calculated. More specifically, the shutter speed t (unit: sec) is determined from the camera image flowing speed V detected in step S1116 and the image flowing deviation δ (unit: mm) obtained in the flowing shooting mode, by calculating "t=δ/V", and then the shutter priority AE mode is set in accordance with the resultant shutter speed. In the case of the first embodiment, it is assumed that δ=1 (mm).

Herein, δ is set to a value significantly smaller than a flowing deviation for a background image employed in a conventional technique, so that the influence of the camera-shake is prevented by setting the shutter speed to a value higher than is employed in the conventional technique and the main object can be separated from the background in an image processing step which will be described later.

Thus, in the present step S1117, a program line is selected depending on the panning angular velocity of the camera and the focal length of the photo-taking lens. More specifically, when the panning angular velocity is low, the program line denoted by "FLslow" in FIG. 6 is selected. The program line "FLmid" is selected when the panning angular velocity has a middle value, and the program line "FLfast" is selected when the panning angular velocity has a large value.

In step S1118, it is determined whether the release button 105 shown in FIG. 1 is pressed into a full-pressed position, that is, whether the switch 142 (SW2) shown in FIG. 2 is turned on. If the switch 142 is not turned on, the process returns to step S1105 to repeat the visual-line detection, the light measurement, the focus adjustment, the setting of an aperture value and a shutter speed, and the display of a preview image.

In the case where the switch 142 is turned on, the process proceeds from step S1119 to step S1121 to perform the following release operation.

In step S1121, the quick-return mirror 123 and the sub-mirror 131 shown in FIG. 2 are made to retreat outside the photo-taking light flux.

In step S1122, a diaphragm mechanism (not shown) is driven in accordance with the aperture value determined in step S1117.

Then in step S1123, the focal plane shutter 125 shown in FIG. 2 is controlled in accordance with the shutter speed determined in step S1117 so as to record an object image on a film.

In step S1124, the diaphragm mechanism (not shown) is made to return into a fully opened position.

In step S1125, the quick-return mirror 123 is made to return into the initial position inside the photo-taking light flux.

In step S1126, the winding means 128 shown in FIG. 2 is driven to mechanically charge the quick-return mirror 123 and the focal plane shutter 125 and to wind the film 126 by an amount corresponding to one frame.

In step S1127, photo-taking conditions such as a photo-taking mode, a main object location, an aperture value, a shutter speed, a focal length, and a photo-taking date are magnetically recorded, during transportation of the film, on a magnetic medium of the film by means of the magnetic signal recording means 135 shown in FIG. 2.

In step S1128, the image obtained by the image sensor 134 is displayed on the display means 111, so that the photographer can see what photograph has been taken. Incidentally, in the first embodiment, when a film is exposed, the quick-return mirror 123 is made to retreat outside the photo-taking light flux, and thus the light flux to the image sensor 134 is shut off. In this case, therefore, an image obtained just before the retreat of the mirror 123 is displayed. Then, when a predetermined period of time has elapsed after that, the process returns to step S1103 to prepare for the next photo-taking operation.

Figure 8:
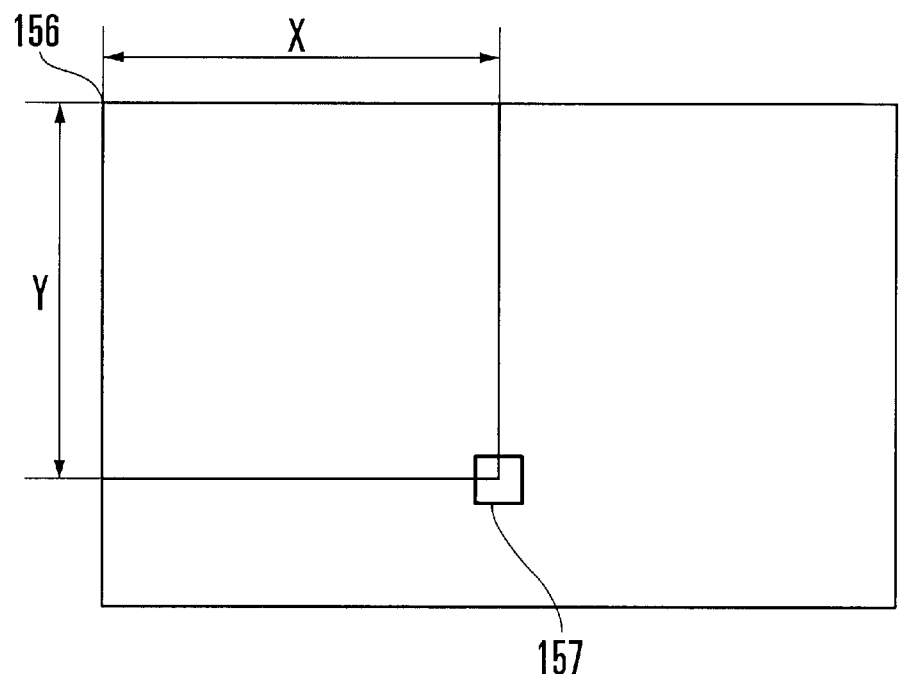
FIG. 8 is a schematic diagram illustrating a manner of defining the location of an object, employed by the camera serving as the image recording apparatus according to the first embodiment of the invention.

Referring to FIG. 8, the definition of the main object location is described.

In FIG. 8, reference numeral 157 denotes a point directed by a visual line of the photographer detected by the visual-line detecting sensor 136, and this point 157 corresponds to the representative location of the main object. Here, if a point 156 at the left and upper corner of the photo-taking image plane is selected as the origin, the coordinates OBJ(X, Y) of the point 157, which are represented by a distance X measured in a horizontal direction from the origin and by a distance Y measured in a vertical direction from the origin, represent the main object location.

Figure 9:
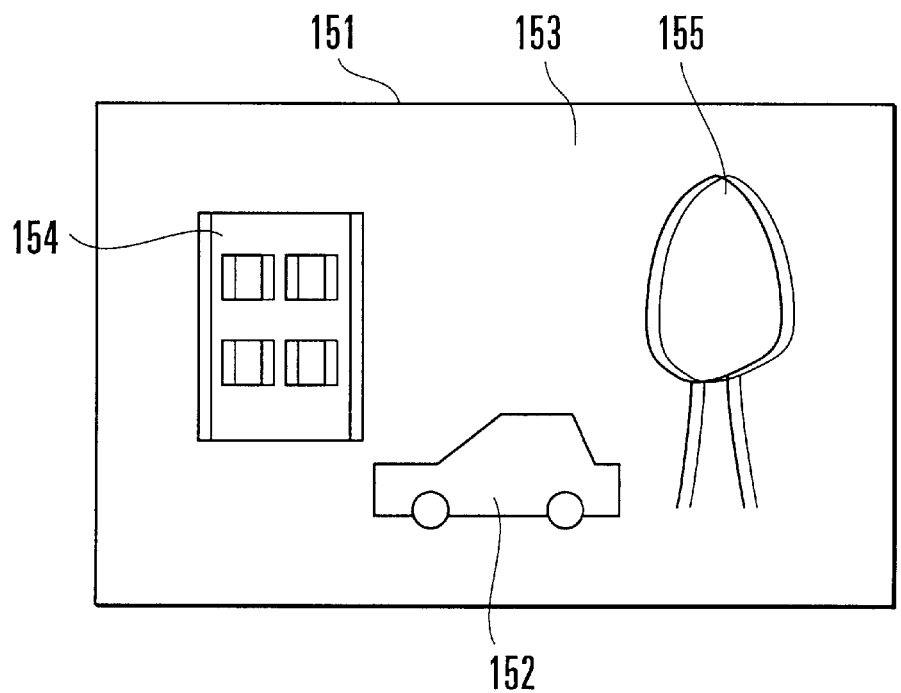
FIG. 9 shows an example of a picture taken in a flowing shooting mode by the camera serving as the image recording apparatus according to the first embodiment of the invention.

FIG. 9 shows an example of an image photographed in the flowing shooting mode according to the flow described above with reference to FIG. 7. As shown in FIG. 9, the main object 152 is recorded in a still state without being blurred. On the other hand, the background images 153, 154 and 155 are recorded in the state of flowing by 1 mm in the horizontal direction. This amount of flowing corresponds to the image flowing deviation δ of 1 mm set in step S1116 shown in FIG. 7.

Figure 10:
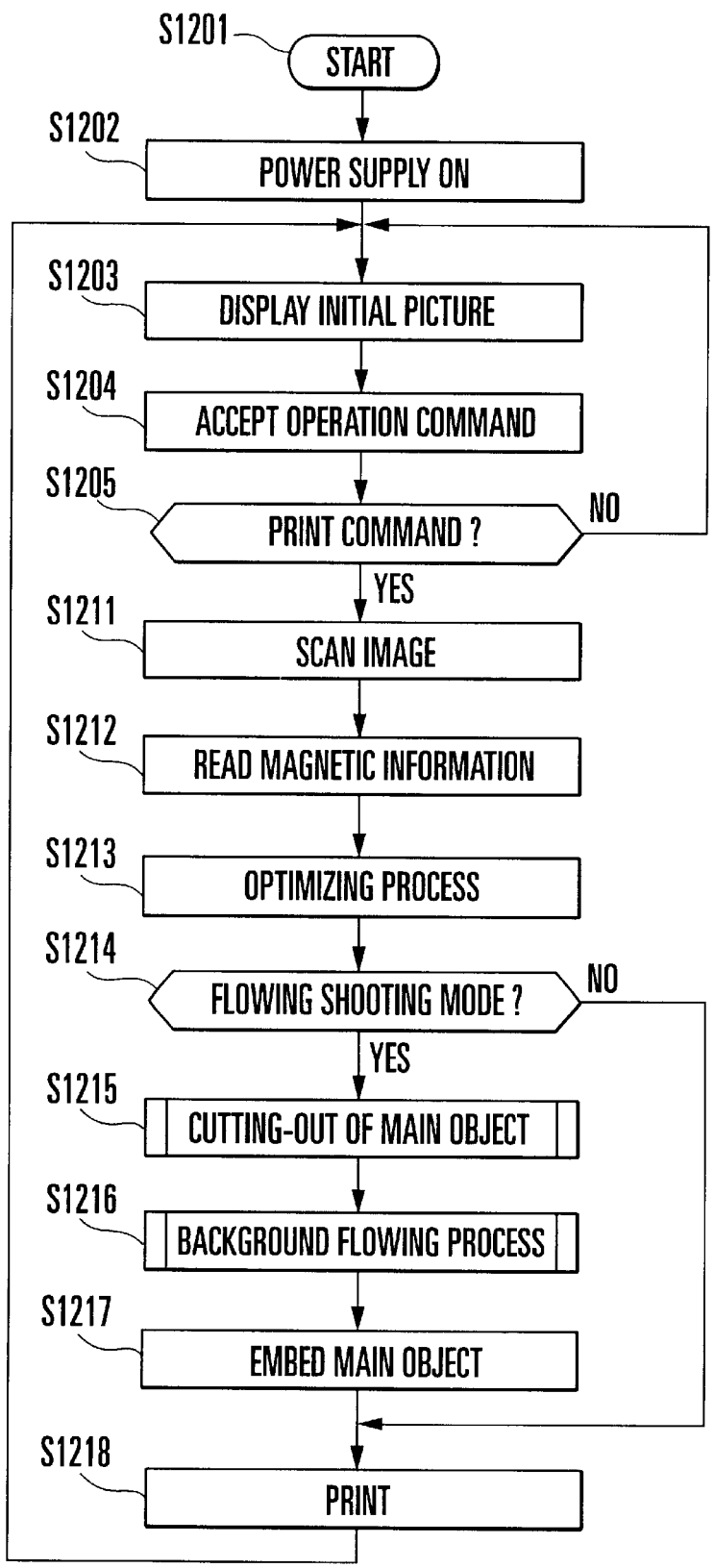
FIG. 10 is a flow chart illustrating a main control operation in an image reproducing apparatus according to the first embodiment of the invention.

FIG. 10 is a flow chart illustrating a flow associated with an image processing and outputting operation performed by the image reproducing apparatus according to the first embodiment of the invention.

When the power supply switch 182 of the image reproducing apparatus body 181 is turned on, in step S1202, the CPU 183 is activated from a sleep state into an active state, and electric power is supplied to various circuits in the image reproducing apparatus body 181 and also to peripheral devices, thereby making it possible to start an image reproducing flow. Then, in step S1203, an initial picture (not shown) is displayed on the display means 184.

In step S1204, an operation command issued by the photographer is accepted.

In step S1205, it is determined whether a print command has been issued in step S1204. If the print command is not issued, the process returns to step S1203 to wait until the print command is issued. If it is determined that the print command has been issued, the process proceeds to step S1211.

In step S1211, the film scanner 191 shown in FIG. 2 is activated to read an optical image recorded on a film. The thus-obtained image signal is transferred to the CPU 183.

In step S1212, at the same time of the operation of image reading in step S1211, photo-taking information recorded on the magnetic layer of the film is read, and the thus-obtained photo-taking information is transferred to the CPU 183.

In step S1213, an image optimization process, such as a negative-positive conversion, white balance adjustment and γ adjustment, is performed on the image acquired in the previous step.

In step S1214, on the basis of the photo-taking information obtained in step S1212, it is determined whether the image was photographed in the flowing shooting mode. If the image was photographed in a mode other than the flowing shooting mode, the process jumps to step S1218.

In step S1218, an image-reproduced photograph 197 is delivered by printing the image subjected to the optimizing process in step S1213.

If it is determined in step S1214 that the image was photographed in the flowing shooting mode, the process proceeds to step S1215.

In step S1215, the cutting-out of the main object is performed by separating the main object, which is in the still state, from the background, which is in the flowing state, using a method which will be described later.

In step S1216, the background image remaining after the cutting-out of the main object performed in step S1215 is subjected to a process for enhancing the flowing shooting effect using a method which will be described later.

In step S1217, the image of the main object cut out in step S1215 is embedded into the flowing-enhanced background image obtained in step S1216. Thus, a final image is obtained.

The final image obtained in step S1218 is then printed, thereby producing a photograph 197.

Figure 11:
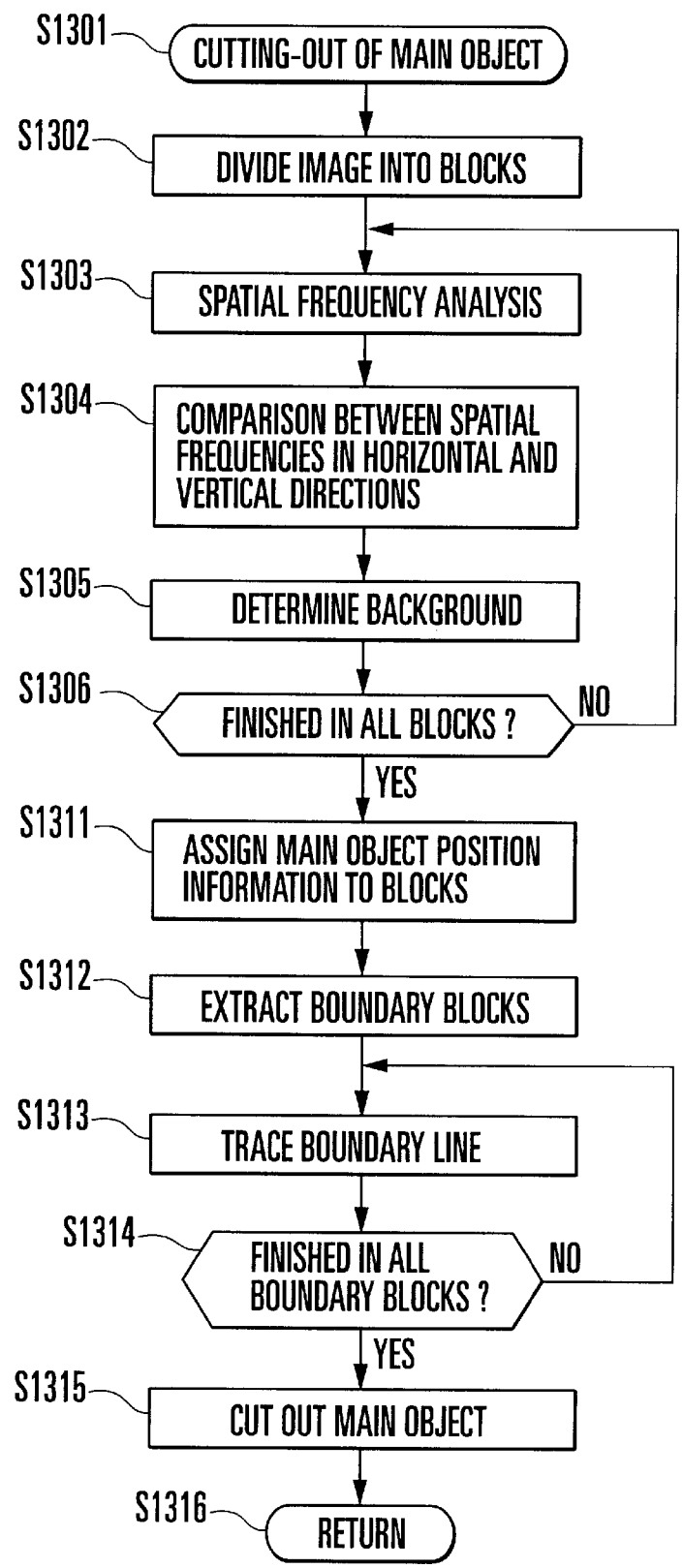
FIG. 11 is a flow chart illustrating the subroutine for cutting-out of a main object in the image reproducing apparatus according to the first embodiment of the invention.
Figure 12:
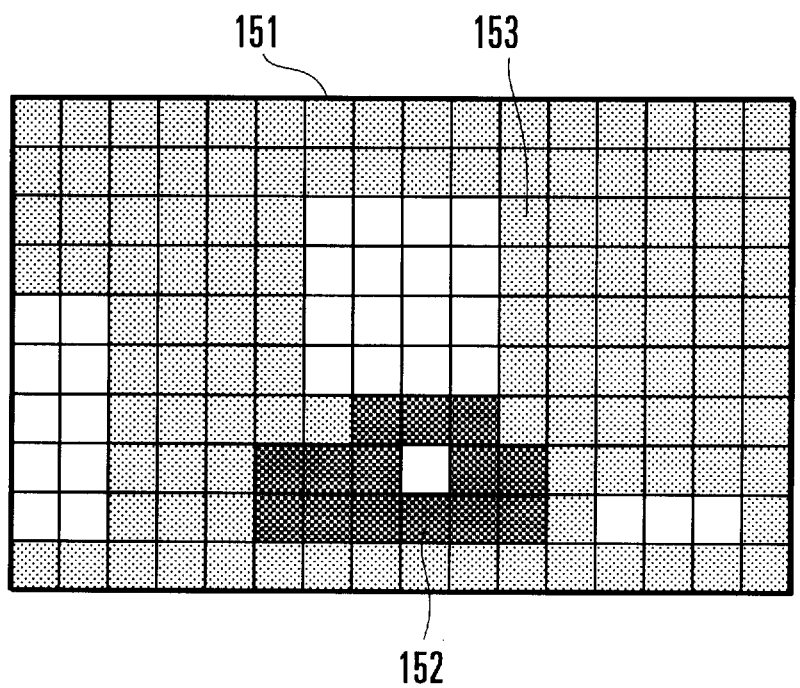
FIG. 12 is a schematic diagram illustrating an image obtained in the middle of the main-object cutting-out subroutine performed by the image reproducing apparatus according to the first embodiment of the invention.

FIG. 11 is a control flow chart illustrating, in further detail, the main-object cutting-out subroutine performed in step S1215 shown in FIG. 10. FIG. 12 is a schematic diagram for explaining the main-object cutting-out process in the subroutine shown in FIG. 11.

In FIG. 11, in step S1302 after step S1301, the image read by the film scanner 191 is divided into small blocks as shown in FIG. 12. Each block is composed of, for example, "100 pixels×100 pixels". In the example shown in FIG. 12, the image is divided into "10 blocks in the vertical direction×16 blocks in the horizontal direction".

In step S1303, an image in the first block is Fourier-transformed to perform spatial frequency analysis of the image.

In step S1304, the spatial frequency spectrum in the horizontal direction obtained in step S1303 is compared with the spatial frequency spectrum in the vertical direction also obtained in step S1303.

In step S1305, on the basis of the comparison result obtained in step S1304, it is determined whether the present block belongs to the main object image or the background image in the flowing shooting scene. More specifically, if the block has high-frequency components in both the vertical and horizontal directions, the block is regarded as belonging to the main object image. On the other hand, if the spatial frequency spectrum in the vertical direction has low-frequency components compared with that in the horizontal direction, the block is regarded as belonging to the background image flowing in the horizontal direction. In the other cases, the block is not identified.

In step S1306, it is determined whether the arithmetic operation from steps S1303 to S1305 has been performed for all blocks. If not, the process returns to step S1303 to perform the arithmetic operation for the next block. If the arithmetic operation has been performed for all the blocks, the process proceeds to step S1311.

The arithmetic operation result obtained at this point of time is shown in FIG. 12. Blocks which have been determined to belong to a still image portion are dark-shaded, and blocks which have been determined to belong to a flowing image portion are lightly-shaded. Block which are not identified are denoted by non-shaded blocks.

In step S1311, the main object location information recorded on the magnetic medium layer on the film is assigned to blocks of the image being processed in the present subroutine. The information of the main object location represented according to the definition described above with reference to FIG. 8 is magnetically recorded on the film and read in step S1212 shown in FIG. 11. The information of the main object location recorded in the form of coordinates in the photo-taking image plane is converted into the block number of blocks produced in step S1302 of the flow chart shown in FIG. 11.

In step S1312, from the main object image blocks extracted in steps S1303 to S1306, blocks which are more likely to belong to the main object image are extracted in accordance with the information of the main object location which was recorded when the object was photographed and which has been detected in step S1311. Boundary blocks on a boundary of the main object image are then extracted as denoted by blocks 152 in FIG. 12.

In step S1313, for each of the boundary blocks extracted in step S1312, a boundary line between the main object image and the background image in each block is extracted.

The background image is formed in a flowing fashion because the image was taken in the flowing shooting mode, while the main object image is formed in a still fashion. Therefore, the boundary between them is formed of a high-contrast edge. By tracing the edge, the main object image and the background image are separated from each other.

In step S1314, it is determined whether the tracing of the edge has been performed for all boundary blocks. If not, the process returns to step S1313 to perform edge tracing for the next boundary block. In the case where edge tracing has been performed for all the boundary blocks, the process proceeds to step S1315.

Figure 13:
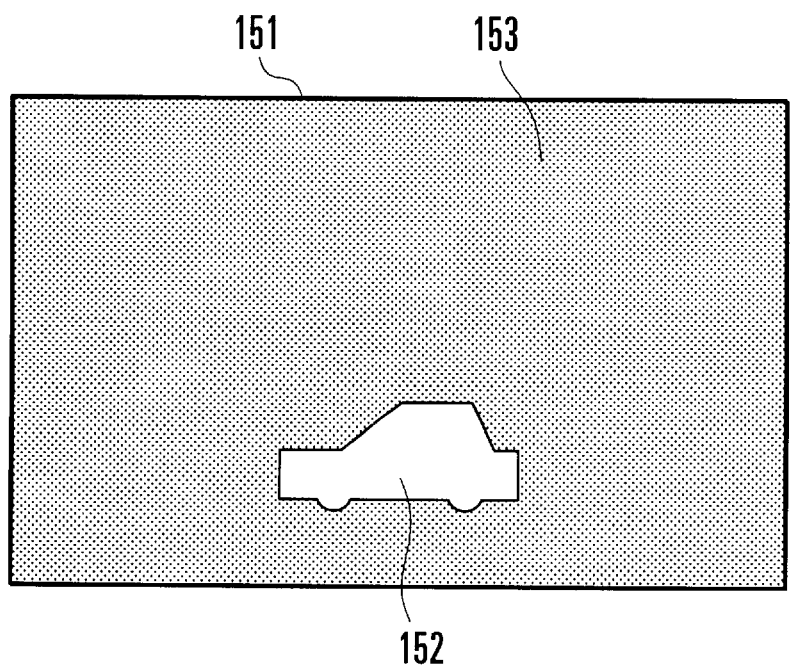
FIG. 13 is a schematic diagram illustrating a final image produced by the main-object cutting-out subroutine performed by the image reproducing apparatus according to the first embodiment of the invention.

In step S1315, the boundary lines in the boundary blocks determined in step S1313 are connected from one to another so as to produce a single closed boundary line surrounding the main object image. The main object image surrounded by the boundary line is then cut out from the photographed image. FIG. 13 illustrates the resultant image, in which reference numeral 153 denotes the background image and reference numeral 152 denotes an area from which the main object image has been cut off.

Figure 14:
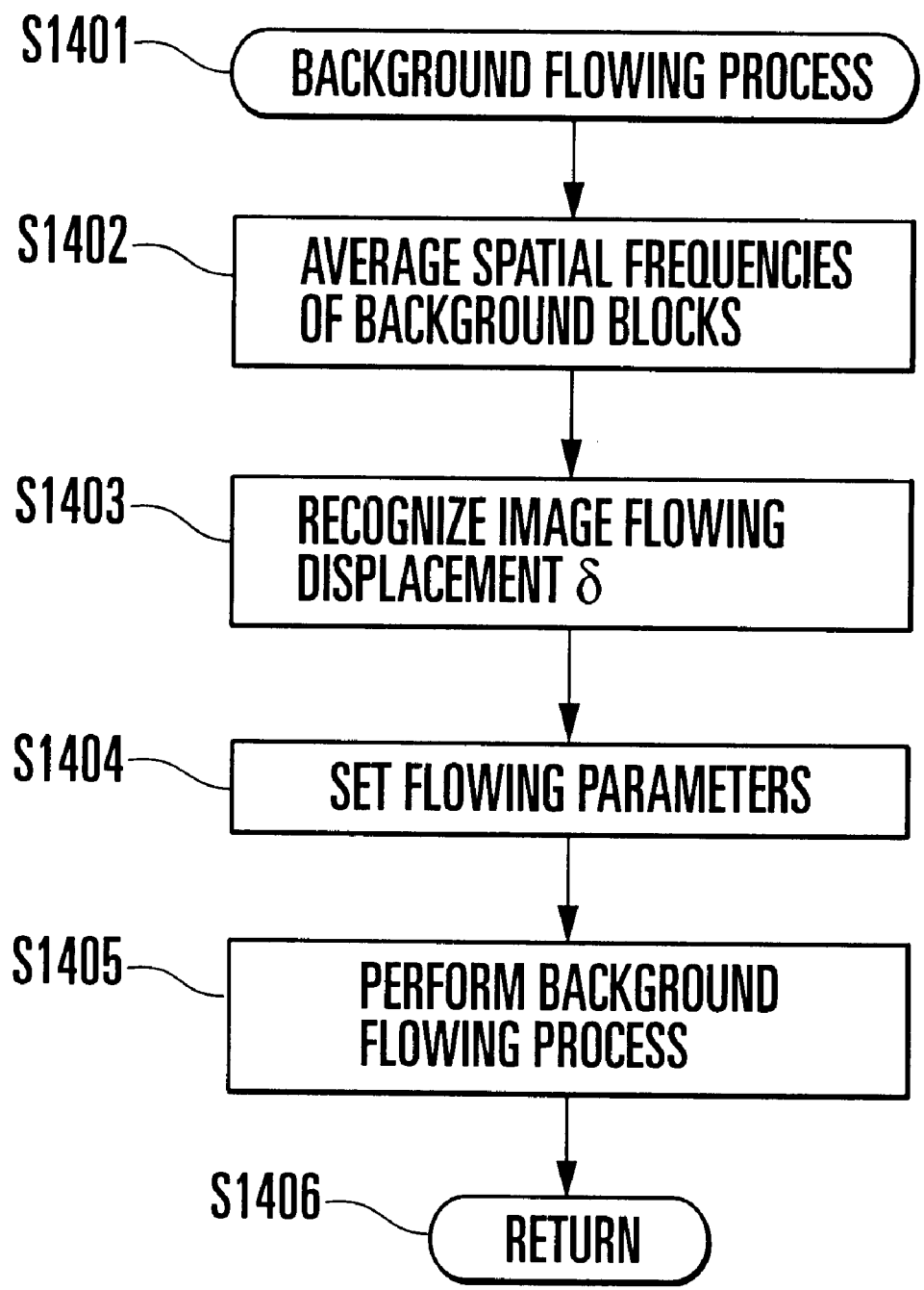
FIG. 14 is a flow chart illustrating a background flowing subroutine performed by the image reproducing apparatus according to the first embodiment of the invention.
Figures 15, 16:
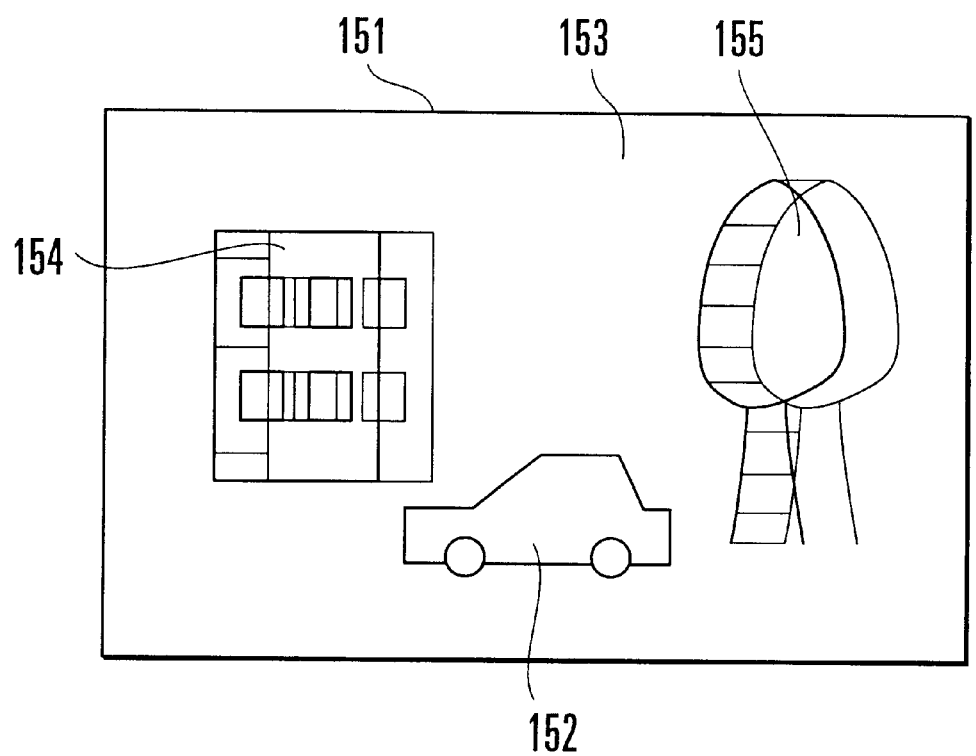
FIG. 15 is a schematic diagram illustrating an image processing filter used by the image reproducing apparatus according to the first embodiment of the invention.
FIG. 16 shows a final image obtained by means of the image processing performed by the image reproducing apparatus according to the first embodiment of the invention.

FIG. 14 is a control flow chart illustrating, in further detail, the background flowing subroutine performed in step S1216 shown in FIG. 10. FIG. 15 is a diagram for explaining an image processing filter used in the background flowing subroutine.

In step S1402 after step S1401 in FIG. 14, the spatial frequencies of the background blocks are averaged.

More specifically, the mean value of the spatial frequencies in two-dimensional directions is calculated for the background blocks extracted in steps S1302 to S1306 in FIG. 11.

In step S1403, the flowing length δS of the background image is determined from the mean spatial frequency calculated in step S1402. That is, in step S1403, the image flowing deviation δ, which was set when the image was taken as described above with reference to step S1117 in FIG. 7, is reproduced from the photographed image.

The flowing length is calculated according to "δS=K1/SF", where K1 is a predetermined constant and SF is the dominant spatial frequency of the background image in the flowing direction.

In step S1404, parameters which determine the amount of flowing for the background image are set. For example, when the flowing length of a background image of an actually-taken picture is 1 mm, if the flowing length is expanded by a factor of 5, the flowing shooting effect is enhanced to a sufficient degree. FIG. 15 illustrates an example of the image processing filter produced in accordance with the given parameters.

When a two-dimensional digital image is filtered for gradation or edge enhancement, the filter characteristic required for gradation or edge enhancement is generally given by a two-dimensional matrix of "m columns×n rows".

Thus, in the first embodiment of the invention, the filter shown in FIG. 15 is employed for enhancing the flowing of a background image of a picture taken in the flowing shooting mode. In this filter, the two-dimensional matrix has a greater number of elements in the horizontal direction than in the vertical direction. Weighting factors equal to "1" are placed in the center on a middle horizontal line, and weighting factors equal to "½" are placed around them.

The number of columns of the matrix in the horizontal direction is set to be equal to the number of pixels corresponding to a predetermined number of times the amount of image flowing δS detected above, i.e., 5 mm, which is obtained by multiplying the amount of image flowing δS by "5". If all pixels of a two-dimensional image are multiplied by this matrix pixel by pixel, the spatial frequency of the image in the horizontal direction is reduced, so that a similar effect to the flowing shooting effect can be obtained.

In step S1405, the background image shown in FIG. 13 is processed using the matrix filter produced in step S1404 as shown in FIG. 15. Then, when the main object image, which has been cut out in FIG. 12 and saved, is embedded to the original location of the processed image, a final image is obtained as shown in FIG. 16. After that, in step S1406, the process exits from the subroutine.

The operation of the camera for taking a picture and the image processing performed by the image reproducing apparatus have been described in detail above. The procedure from the start of taking a picture until an image is finally outputted is summarized below.

When the photographer wants to take a picture in the flowing shooting mode, the photographer sets the photo-taking mode of the camera into the flowing shooting mode as shown in FIG. 5 before taking a picture.

In response, the camera 101 determines the shutter speed, in accordance with the focal length of the photo-taking lens and the panning angular velocity of the camera, so as to produce a desired amount of image flowing deviation δ in the image plane. An exposure control program line is then determined as shown in FIG. 6.

An APEX calculation is then performed on the basis of the above exposure control program line, the object brightness, and the film sensitivity, thereby determining the shutter speed and the aperture value, whereby exposure of the film is properly controlled.

After completion of the exposure, the film is wound by an amount corresponding to one frame. During the film winding operation, photo-taking information, such as information indicating that the picture was taken in the flowing shooting mode, information representing the main object location on the image plane determined on the basis of the detection of the visual line of the photographer, and information representing other conditions, is recorded on the magnetic layer coated on the film.

After completion of the photo-taking operation, the photographer takes the film out of the camera and has the film developed at a photofinishing laboratory. After development, the film is subjected to the following process by an image reproducing apparatus possessed by the photographer himself/herself or at the photofinishing laboratory.

First, the cartridge containing the developed film is loaded on the film scanner, and optical information recorded on the film and photo-taking condition information recorded on the magnetic layer are read by the film scanner.

If the photo-taking information indicates that a picture was taken in the flowing shooting mode, spatial frequency analysis is performed on the picture image, and still image portions and flowing image portions are discriminated from each other. Taking further into account the main object location information recorded on the magnetic layer, a main object image is separated from a background image, thereby obtaining a background image signal such as shown in FIG. 13.

A properly-selected flow enhancement filter is then applied only to the background image. After that, the main object image which was not subjected to the flowing process is embedded into the background image. Thus, the image processing process is completed and a final image is obtained as shown in FIG. 16. The image is then displayed on a monitor or printed on paper.

Although in the first embodiment described above the main object location information is determined in accordance with information outputted from the visualline detecting sensor 136, an arbitrary location on the photo-taking image plane may be designated using the scroll button 112 disposed on the back side of the camera.

Alternatively, the photo-taking image plane may be divided into a plurality of blocks and assigned block numbers, so that the location of the main object image may be designated by a block number assigned to a particular block.

The image processing method for enhancing the flowing shooting effect is not limited to a multiplication using a two-dimensional filter such as that shown in FIG. 15.

In the first embodiment, as described above, if the flowing shooting mode is selected when a picture is taken, photo-taking conditions are set so that a main object image is formed in a still fashion without being blurred while a background image is formed in a flowing fashion, thereby preventing the main object image from being blurred.

Because the background image in the photographed picture has a predetermined amount of flowing, the main object image can be precisely separated from the background image. This makes it possible to eliminate an error in the flowing effect enhancement process performed on the background image.

Furthermore, because information representing photo-taking conditions employed when a picture is taken is recorded together with an image and supplied to an image reproducing apparatus, the photographer can obtain a picture which has been subjected to desired image processing without having to perform a special operation or give a special order.

Because information indicating the main object location on the image plane, inputted or detected when a picture was taken, is recorded together with an image and supplied to an image reproducing apparatus, a main object can be precisely separated from a background, thereby ensuring that an error is prevented in the flowing effect enhancement process performed on the background image.

Furthermore, because image processing parameters are automatically determined depending on the frequency characteristic of a photographed image, the photographer can easily obtain a picture subjected to desired image processing without having to perform a special operation or give a special order.

Second Embodiment

In the first embodiment, a technique of effectively taking a picture with a flowing shooting effect has been described.

In a second embodiment of the invention, a technique of obtaining a background image effectively blurred in a picture such as a portrait is described below. In the second embodiment, a photo-taking mode in which only a main object is focused is referred to as a portrait mode. It is to be noted that a technique of taking a picture with a shallow depth of field so that only a particular object is focused is also called a shallow focusing technique.

Referring to FIGS. 17 to 29, the second embodiment of the invention is described below. A camera and an image reproducing apparatus having similar constructions to those employed in the first embodiment are also employed herein in the second embodiment, and thus they are not described in further detail.

Figure 17:
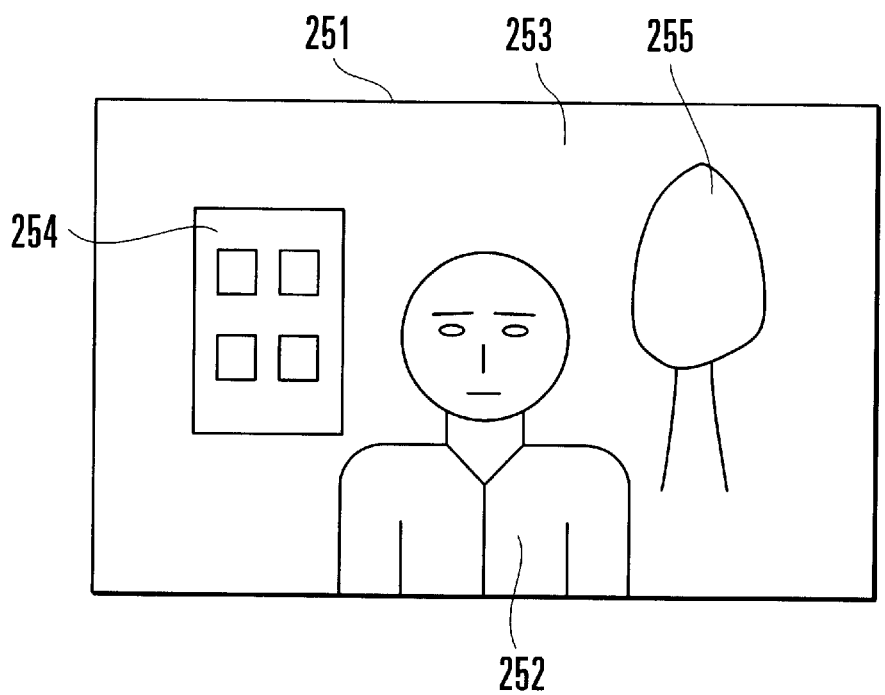
FIG. 17 shows an example of a scene which may be photographed in an advantageous fashion according to a second embodiment of the invention.

FIG. 17 illustrates a typical example of a portrait scene. A photo-taking image plane 251 includes a human FIG. 252 which is a main object, a background 253, a building 254 which is a part of the background, and a tree 255 which is also a part of the background.

The picture shown in FIG. 17 is assumed to be photographed in a program AE mode which is employed in many cases. In the program AE mode, when an object has a high brightness, the aperture value is set to a small-diameter value. In this case, all the main object 252 and the background images 253–255 fall within the depth of field, so that a blurring effect is not obtained in the background images. A similar situation occurs when a wide-angle lens with a large depth of field is used.

In the second embodiment of the invention, there is provided a camera which allows any photographer, even a beginner, to take a high-quality portrait picture in a particular fashion desired by the photographer.

Figure 18:
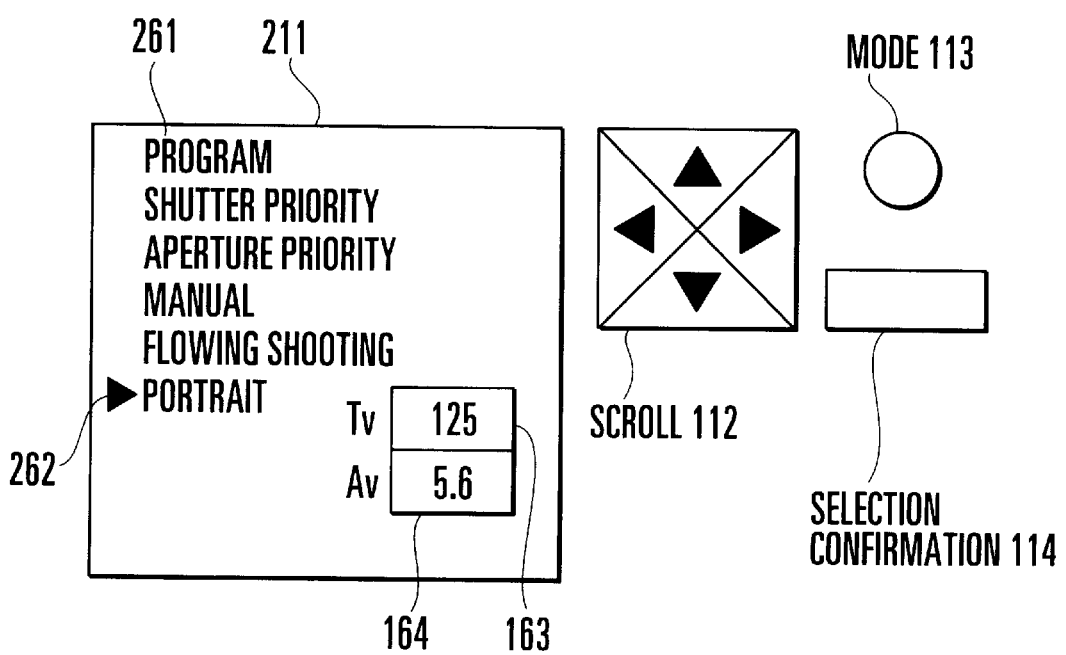
FIG. 18 is a schematic diagram illustrating an initial picture on a display means of a camera serving as an image recording apparatus according to the second embodiment of the invention.

FIG. 18 is a schematic diagram illustrating an initial picture on a display means 211 of a camera 201 according to the second embodiment of the invention. Because the camera 201 employed in the second embodiment is similar in construction to the camera 101 employed in the first embodiment, FIGS. 1 and 2 are also used to describe the camera 201, wherein new reference numerals are used only when parts different from those in the first embodiment are described.

In FIG. 18, the display means 211 and various operation members disposed on the back side of the camera 201 are shown for the situation in which the main switch 104 of the camera 201 is turned on to supply electric power to the camera 201.

In the display means 211, reference numeral 261 denotes a camera operation mode display part, and reference numeral 262 denotes a photo-taking mode selection pointer. The display means 211 also includes a shutter speed display part 163 and an aperture value display part 164.

Figure 19:
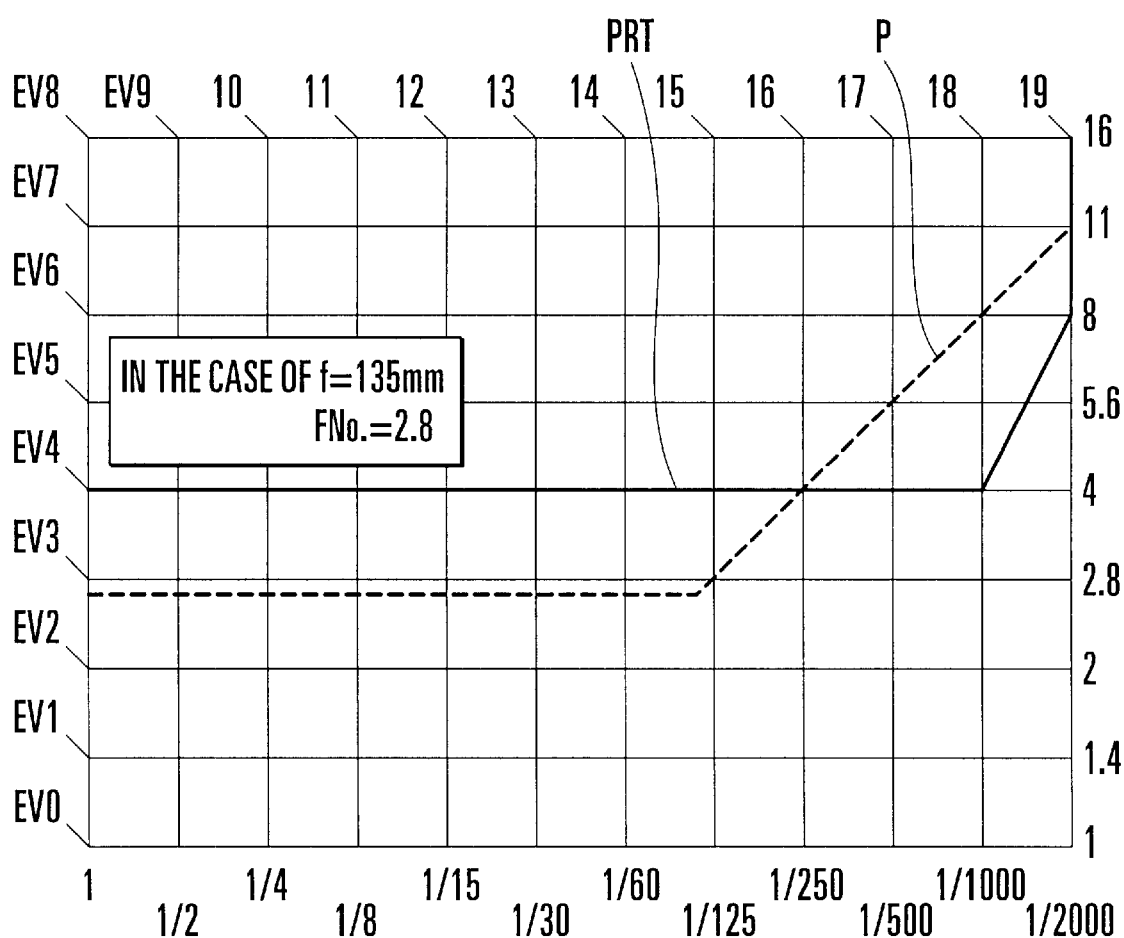
FIG. 19 is a graph illustrating exposure control program lines employed by the camera serving as image recording apparatus according to the second embodiment of the invention.

FIG. 19 illustrates a program line diagram according to which the camera 201 controls an exposure. Differences of the second embodiment from the first embodiment are described below with reference to FIGS. 18 and 19.

In the "PROGRAM" mode and the "FLOWING SHOOTING" mode shown in FIG. 18, operations are performed in similar manners to those in the first embodiment described in FIG. 5. In FIG. 19, a representative program mode "P" is represented in the EV plane.

In FIG. 18, "PORTRAIT" denotes a portrait mode which is peculiar to the second embodiment. If the photographer selects the portrait mode, a program line is set, for example, as denoted by "PRT" in FIG. 19, depending on photo-taking conditions.

Figure 20:
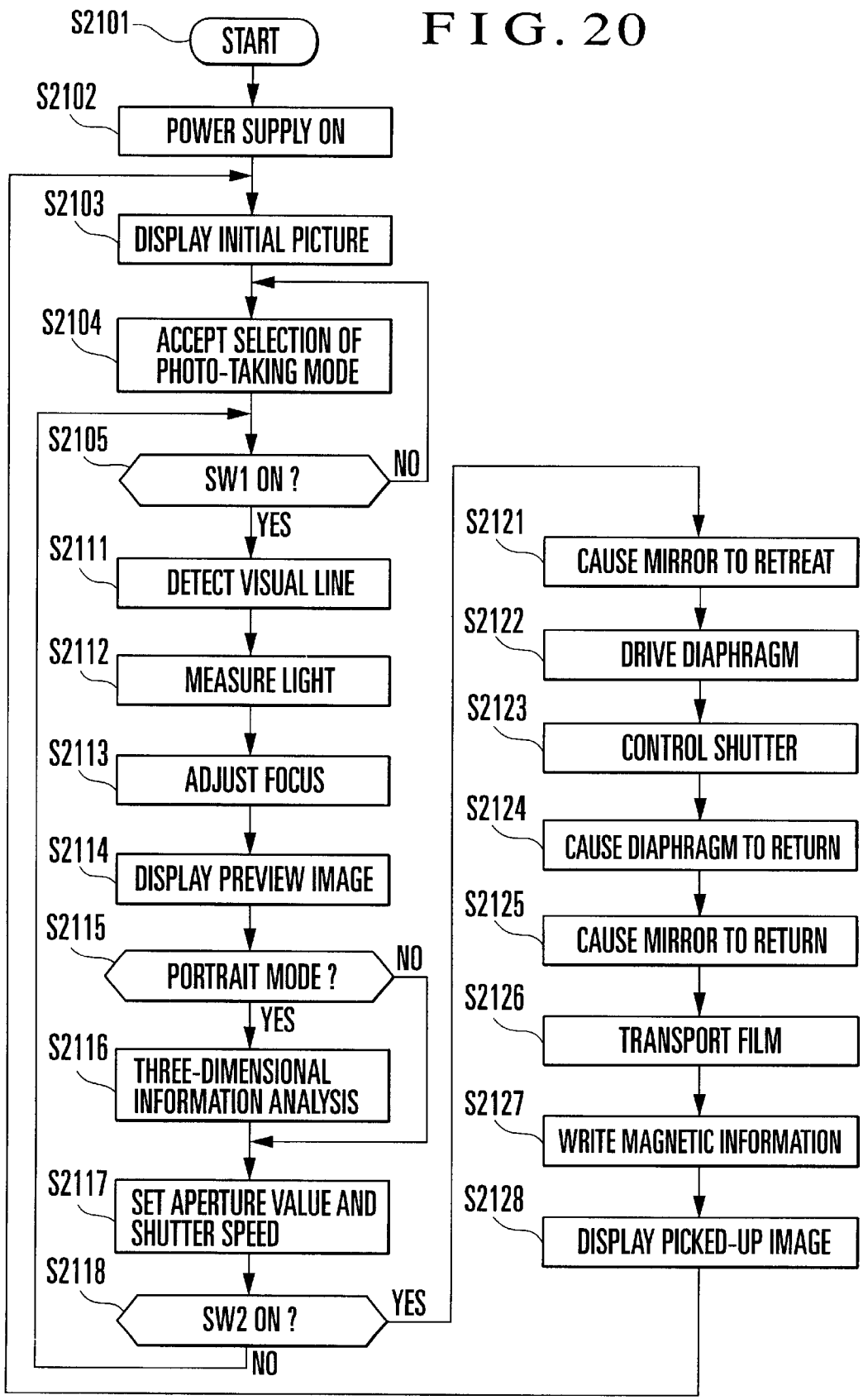
FIG. 20 is a control flow chart associated with a phototaking process performed by the camera serving as the image recording apparatus according to the second embodiment of the invention.

FIG. 20 is a flow chart illustrating a control flow of an operation of taking a picture using the camera 201 according to the second embodiment.

The flow of the second embodiment is different from that of the first embodiment in that step S1115 for determining whether the flowing shooting mode is selected is replaced with step S2115 for determining whether the portrait mode is selected, and that step S1116 for recognizing the background flowing speed is replaced with step S2116 for analyzing three-dimensional information. The other steps are similar to those in the first embodiment.

Referring to the flow chart shown in FIG. 20 in conjunction with FIGS. 18 and 19, the second embodiment is described below. Different steps from those in the first embodiment are described in detail. However, similar steps are described in a brief fashion.

If, in step S2101 after starting at step S2102, the photographer turns on the main switch 104 of the camera 201, the CPU 121 of the camera 201 is activated from a sleep state into an active state, and electric power is supplied to various circuits in the camera 201, thereby allowing a photo-taking operation to be started. In step S2103, an initial picture is displayed on the display means 211 as shown in FIG. 18.

In step S2104, the photographer is allowed to select a camera photo-taking mode. If the photographer presses the mode selection button 113, available photo-taking modes are displayed on the display means 211 as shown in FIG. 18. The photographer is allowed to select a desired photo-taking mode by pressing an up-scroll button part or a down-scroll button part of the scroll button 112. The selected photo-taking mode is indicated by the selection pointer 262.

In the specific example shown in FIG. 18, the "PORTRAIT" mode is selected.

In the next step S2105 in FIG. 20, it is determined whether or not the photo-taking preparation switch 141 (SW1) interlocked with the release button 105 is turned on. If the switch 141 is turned on, the process proceeds to step S2111. However, if the switch 141 is not turned on, the process returns to step S2104 to wait until a photo-taking mode is selected.

If it is determined in step S2105 that the switch 141 is turned on, the process proceeds to step S2111. As in the first embodiment, the visual-line detection in step S2111, the light measurement in step S2112, the focus adjustment in step S2113 and the display of a preview image in step S2114 are performed.

In step S2115, the photo-taking mode selected in step S2104 is determined.

If a photo-taking mode other than the portrait mode is selected, the process jumps to step S2117 to determine the shutter speed and the aperture value in accordance with a predetermined exposure control diagram.

In the case where the portrait mode is selected, the process proceeds to step S2116 to perform the analysis of three-dimensional information on an image displayed on the image plane. More specifically, on the basis of the result of the focus adjustment performed in step S2113, the distribution of defocus for all objects within the photo-taking image plane including a main object and a background is analyzed.

In the next step S2117, the shutter speed and the aperture value are calculated. More specifically, a reference aperture value F is determined from the three-dimensional information of objects detected in step S2116, by the calculation of "F=DEFEAX/$\epsilon$/K2", where DEFMAX denotes the maximum amount of defocus of all areas, i.e., the amount of defocus of the background in the portrait scene, $\epsilon$ is the diameter of an allowable circle of confusion, and K2 is a predetermined coefficient.

In the second embodiment, K2 is selected such that K2=5. In this case, the aperture value is set to a value which causes the diameter of blurring of the background image to be equal to five times the diameter of an allowable circle of confusion.

When these parameters are determined such that DEFMAX=0.6 mm, $\epsilon$=0.03 mm and K2=5, the reference aperture value F becomes equal to 4, and an exposure control line is set as denoted by "PRT" in FIG. 19.

Here, if K2 is set to a too large value, the aperture value is set to a too large value which results in an extremely shallow depth of focus, and thus good focus is obtained only for a particular part of an object. Conversely, if K2 is too small, the aperture value is set to a too small value which results in a too large depth of focus, and thus it becomes difficult to separate a main object from a background in a process which will be described later.

If K2 is set to a proper value which does not cause the above problems, it is possible to obtain a portrait with a proper blurring effect.

In step S2118, it is determined whether the release button 105 of the camera 201 is pressed into a full-pressed position, that is, whether the switch 142 (SW2) shown in FIG. 2 is turned on. If the switch 142 is not turned on, the process returns to step S2105 to repeat the visual-line detection, the light measurement, the focus adjustment, the setting of an aperture value and a shutter speed and the display of a preview image.

In the case where the switch 142 is turned on, the process proceeds from step S2118 to step S2121 to perform the following release operation.

Steps S2121 to S2126 are performed in a similar manner to that in steps S1121 to S1126 of the first embodiment described above with reference to FIG. 7.

In step S2127, photo-taking conditions such as the photo-taking mode, the main object location, the aperture value, the shutter speed, the focal length and the photo-taking date, are magnetically recorded, when a film is wound, on a magnetic medium coated on the film using the magnetic signal recording means 135 shown in FIG. 2.

Figures 21, 22:
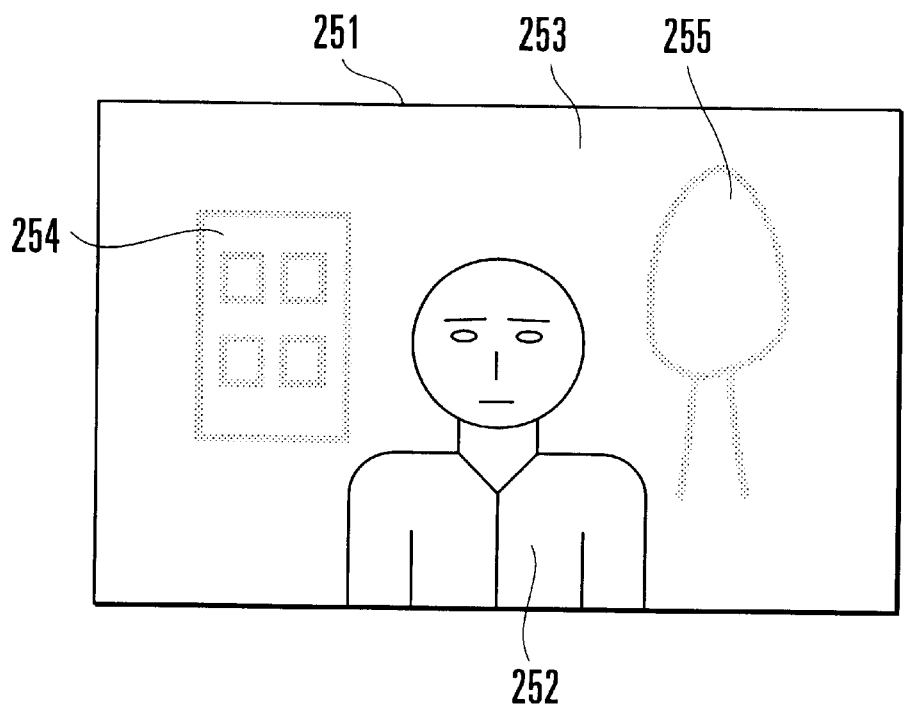
FIG. 21 is a schematic diagram illustrating a manner of defining the location of an object, employed by the camera serving as the image recording apparatus according to the second embodiment of the invention.
FIG. 22 shows an example of a picture taken in a portrait mode by the camera serving as the image recording apparatus according to the second embodiment of the invention.

Referring to FIG. 21, the definition of the main object location is described. In FIG. 21, reference numeral 257 denotes a point directed by a visual line of the photographer detected by the visual-line detecting sensor 136, wherein this point corresponds to the representative location of the main object. The photo-taking image plane is divided into "5 vertical blocks×5 horizontal blocks", that is, 25 blocks in total denoted by reference numeral 256, and block numbers SL1 to SL25 are assigned to these blocks from the left to the right and from the top to the bottom starting from the block at the leftmost and top location.

An area SL18 in which the point 257 directed by the visual line of the photographer is located represents the main object location. Thus, a code representing the block number of. this area is magnetically recorded.

In step S2128, the image obtained by the image sensor 134 is displayed on the display means 211, so that the photographer can see what photograph has been taken. Then, when a predetermined period of time has elapsed after that, the process returns to step S2103 to prepare for the next photo-taking operation.

FIG. 22 shows an example of an image photographed in the portrait mode according to the flow described above with reference to FIG. 20. The main object image 252 is in good focus. On the other hand, the background images 253, 254 and 255 are blurred by an amount equal to 5 times the diameter of an allowable circle of confusion.

Figure 23:
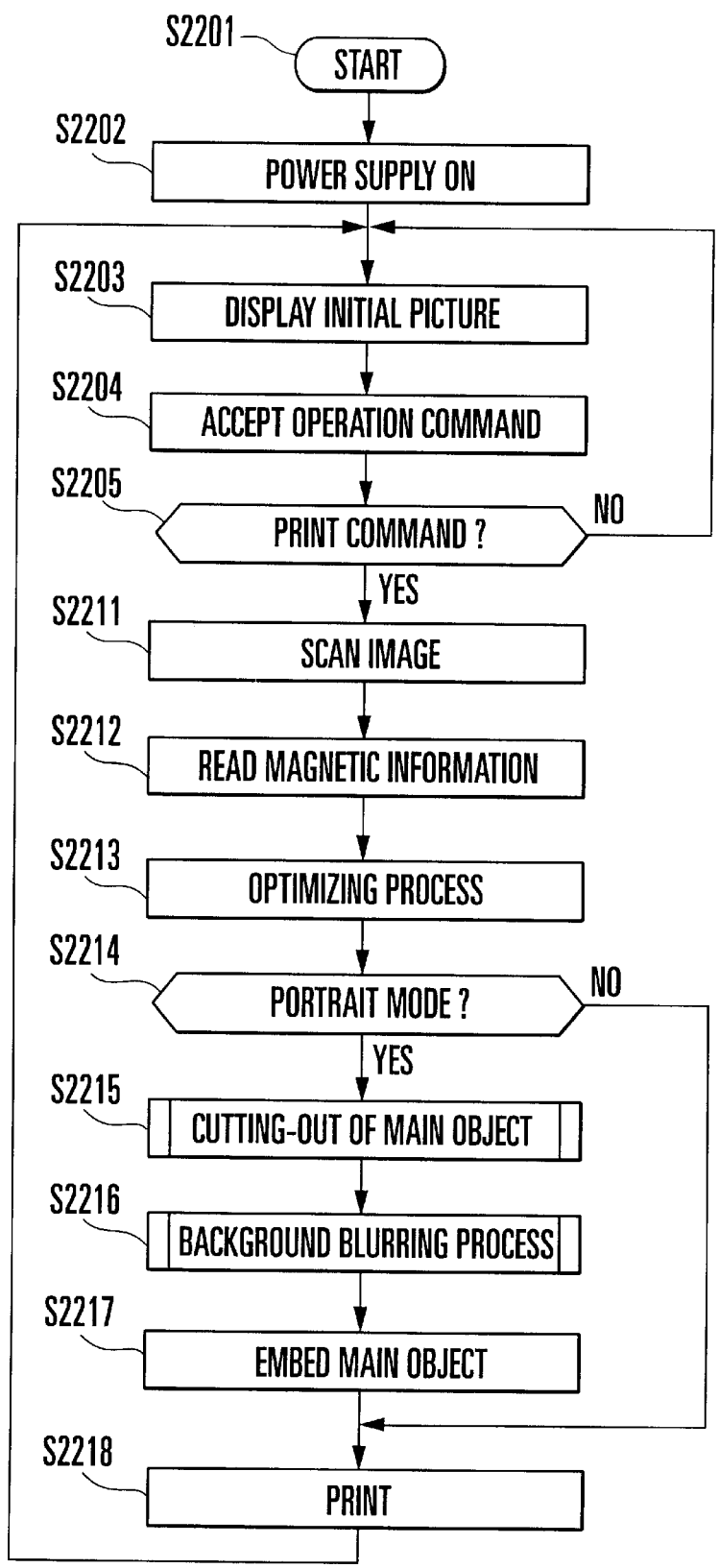
FIG. 23 is a flow chart illustrating a main control operation in an image reproducing apparatus according to the second embodiment of the invention.

FIG. 23 is a flow chart illustrating a flow associated with an image processing and outputting operation performed by the image reproducing apparatus 281 according to the second embodiment of the invention.

This flow is different from that in the first embodiment shown in FIG. 10 in that the main-object cutting-out subroutine in step S2215 is performed in a different manner from the manner of the corresponding step S1215 and that the background flowing subroutine in step S1216 is replaced with a background blurring subroutine in step S2216. The other steps are performed in a similar manner.

The image reproducing apparatus 281 employed herein is similar in construction to the image reproducing apparatus body 181 according to the first embodiment, and thus FIGS. 1 and 2 are also used in the following description. Different steps from those in the first embodiment are described in detail. However, similar steps are described in a brief fashion.

If, in step S2202, the power supply switch 182 of the image reproducing apparatus 281 is turned on, the CPU 183 is activated from a sleep state into an active state, and electric power is supplied to various circuits in the image reproducing apparatus 281 and also to peripheral devices, thereby making it possible to start an image reproducing flow.

Then, in step S2203, an initial picture (not shown) is displayed on the display means 184.

Steps S2204 to S2213 are performed in a similar manner to that in steps S1204 to S1213 of the first embodiment.

In step S2214, on the basis of the photo-taking information read in step S2212, it is determined whether the image was photographed in the portrait mode. If the image was photographed in a mode other than the portrait mode, the process jumps to step S2218.

In step S2218, an image-reproduced photograph 197 is outputted by printing the image optimized in step S2213.

If it is determined in step S2214 that the image was photographed in the portrait mode, the process proceeds to step S2215.

In step S2215, the main object is separated from the background image using a method which will be described later, so that the main object image is cut out.

In step S2216, the background image remaining after the cutting-out of the main object image performed in step S2215 is subjected to a process for blurring the background image using a method which will be described later.

In step S2217, the main object image cut out in step S2215 is embedded into the background image subjected to the background blurring process in step S2216. Thus, a final image is obtained.

The final image obtained in step S2218 is then printed, thereby producing a photograph 197.

Figure 24:
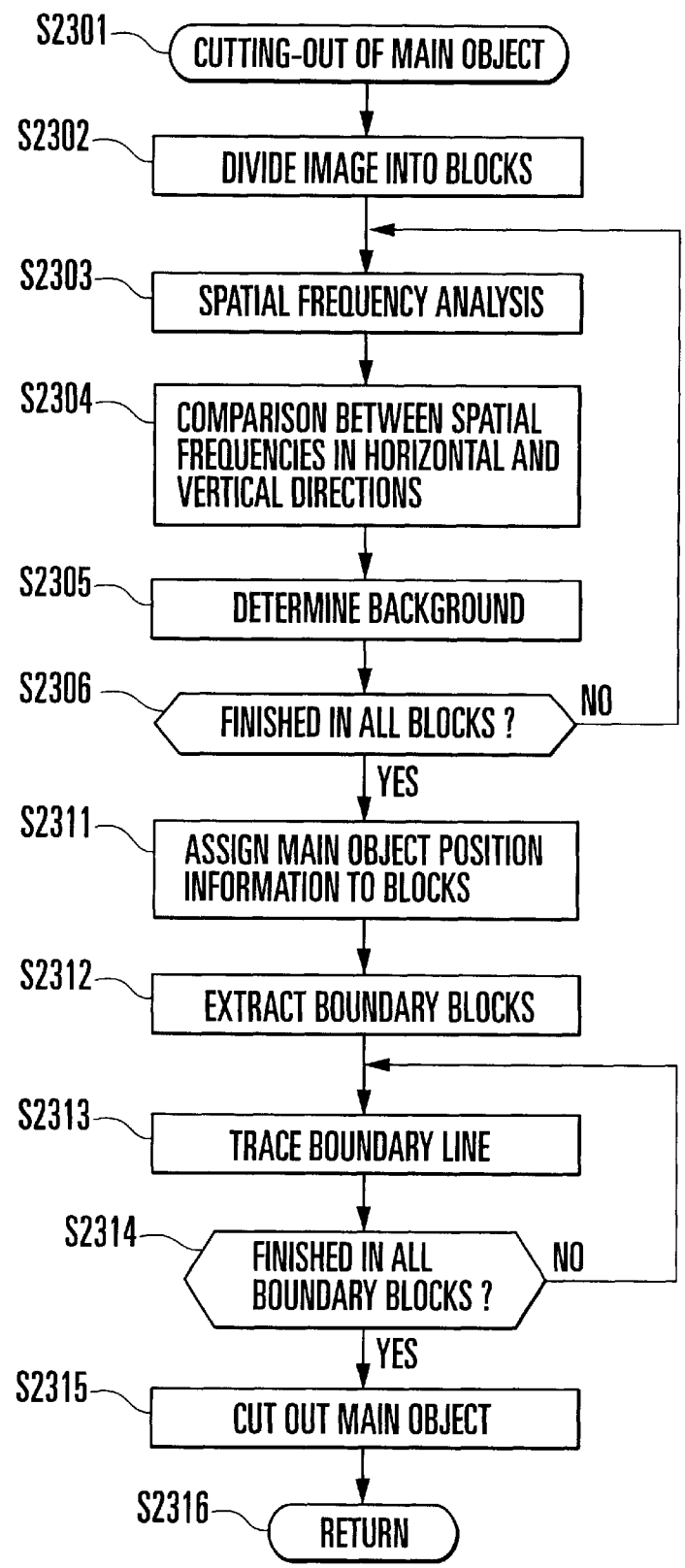
FIG. 24 is a flow chart illustrating the subroutine for cutting-out of a main object in the image reproducing apparatus according to the second embodiment of the invention.
Figure 25:
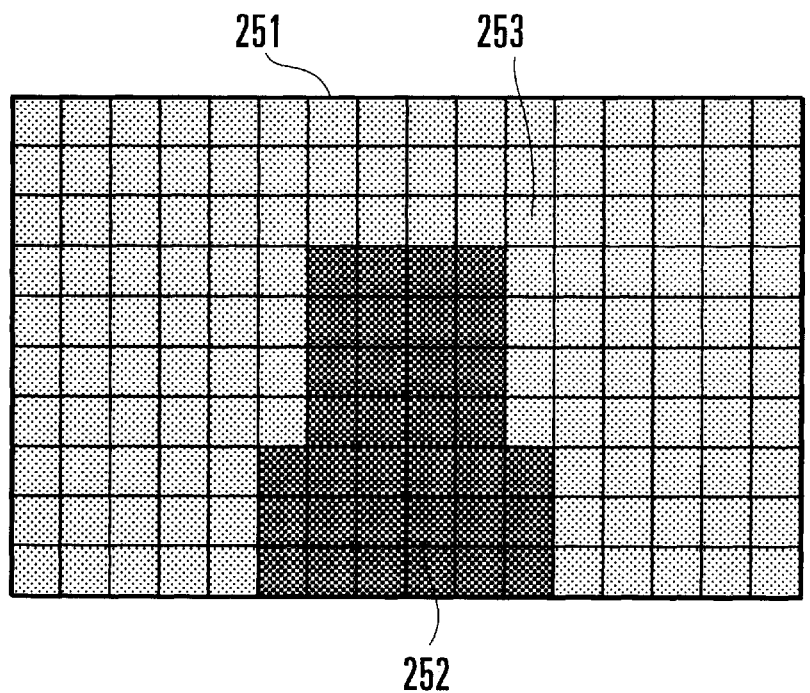
FIG. 25 is a schematic diagram illustrating an image obtained in the middle of the main-object cutting-out subroutine performed by the image reproducing apparatus according to the second embodiment of the invention.
Figure 26:
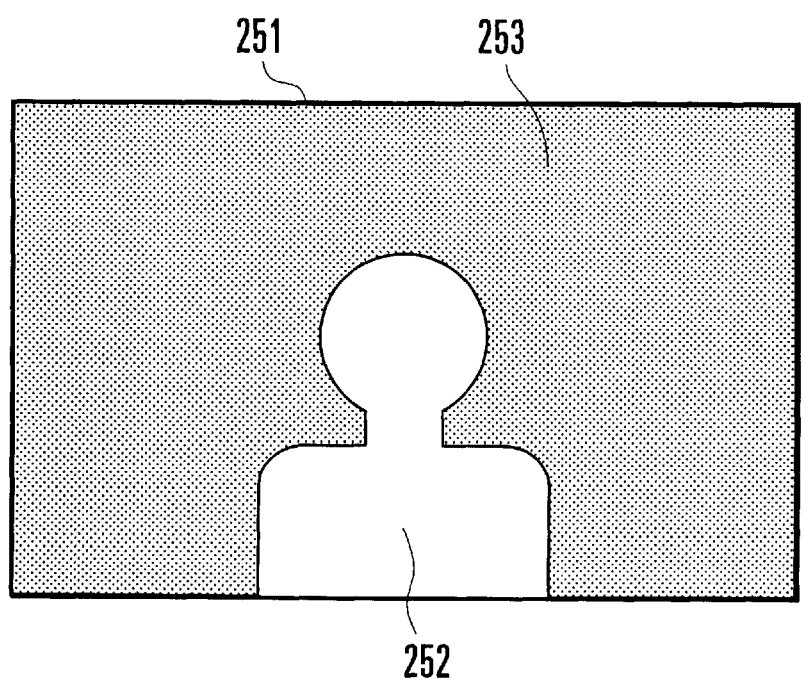
FIG. 26 is a schematic diagram illustrating a final image produced by the main-object cutting-out subroutine performed by the image reproducing apparatus according to the second embodiment of the invention.

FIG. 24 is a control flow chart illustrating, in further detail, the main-object cutting-out subroutine performed in step S2215 shown in FIG. 23. FIGS. 25 and 26 are schematic diagrams for explaining the process of the main-object cutting-out subroutine.

In FIG. 24, in step S2302 after step S2301, the image read by the film scanner is divided into small blocks in a similar manner to that in the first embodiment, as shown in FIG. 25.

In step S2303, an image in the first block is Fourier-transformed to perform spatial frequency analysis.

In step S2304, the spatial frequency spectrum in a horizontal direction obtained in step S2303 is compared with the spatial frequency spectrum in a vertical direction also obtained in step S2303, and specific values thereof are evaluated.

In step S2305, on the basis of the comparison result obtained in step S2304, it is determined whether the present block belongs to the main object image or the background image in the portrait scene. More specifically, when the block has high-frequency components at least in either the vertical or horizontal direction, the block is regarded as belonging to the main object image. If spatial frequencies are low in both the vertical and horizontal directions, the block is regarded as belonging to the background.

In step S2306, it is determined whether the calculation from steps S2303 to S2305 has been performed for all the blocks. If not, the process returns to step S2303 to perform the calculation for the next block. If the calculation has been performed for all the blocks, the process proceeds to step S2311.

The calculation result obtained at this point of time is shown in FIG. 25. Blocks which have been determined to belong to an object image in focus are dark-shaded, and blocks which have been determined to belong to an image portion out of focus are lightly-shaded.

In step S2311, the main object location information recorded on the magnetic medium layer of the film is assigned to blocks of an image being processed in the present subroutine. The information of the main object location is that represented according to the definition described above with reference to FIG. 21 and magnetically recorded on the film and read in step S2212 shown in FIG. 23.

The information of the main object location represented by a location number assigned to a particular small area in the photo-taking image plane is converted into a block number assigned to a corresponding block of blocks produced in step S2302.

In step S2312, from the main object image blocks determined in steps S2303 to S2306, blocks which are more likely to belong to the main object image are extracted in accordance with the information of the main object location which was recorded when the image was photographed and which has been detected in step S2311.

Then, boundary blocks on a boundary of the main object image are then extracted as denoted by blocks 252 in FIG. 25.

In step S2313, a boundary line between the main object image and the background image is extracted for each of the boundary blocks extracted in step S2312. The background image is out of focus and thus blurred. In contrast, the main object image is in good focus. As a result, the boundary between them is formed of a high-contrast edge. By tracing the edge, the main object image and the background image are separated from each other.

In step S2314, it is determined whether the tracing of the edge has been performed for all the boundary blocks. If not, the process returns to step S2313 to perform edge tracing for the next boundary block. In the case where edge tracing has been performed for all the boundary blocks, the process proceeds to step S2315.

In step S2315, the boundary lines in the boundary blocks determined in step S2313 are connected from one to another so as to produce a single closed boundary line surrounding the main object image. The main object image surrounded by the boundary line is then cut out from the photographed image.

FIG. 26 illustrates the resultant image, in which reference numeral 253 denotes the background image and reference numeral 252 denotes an area from which the main object image has been cut out.

Figure 27:
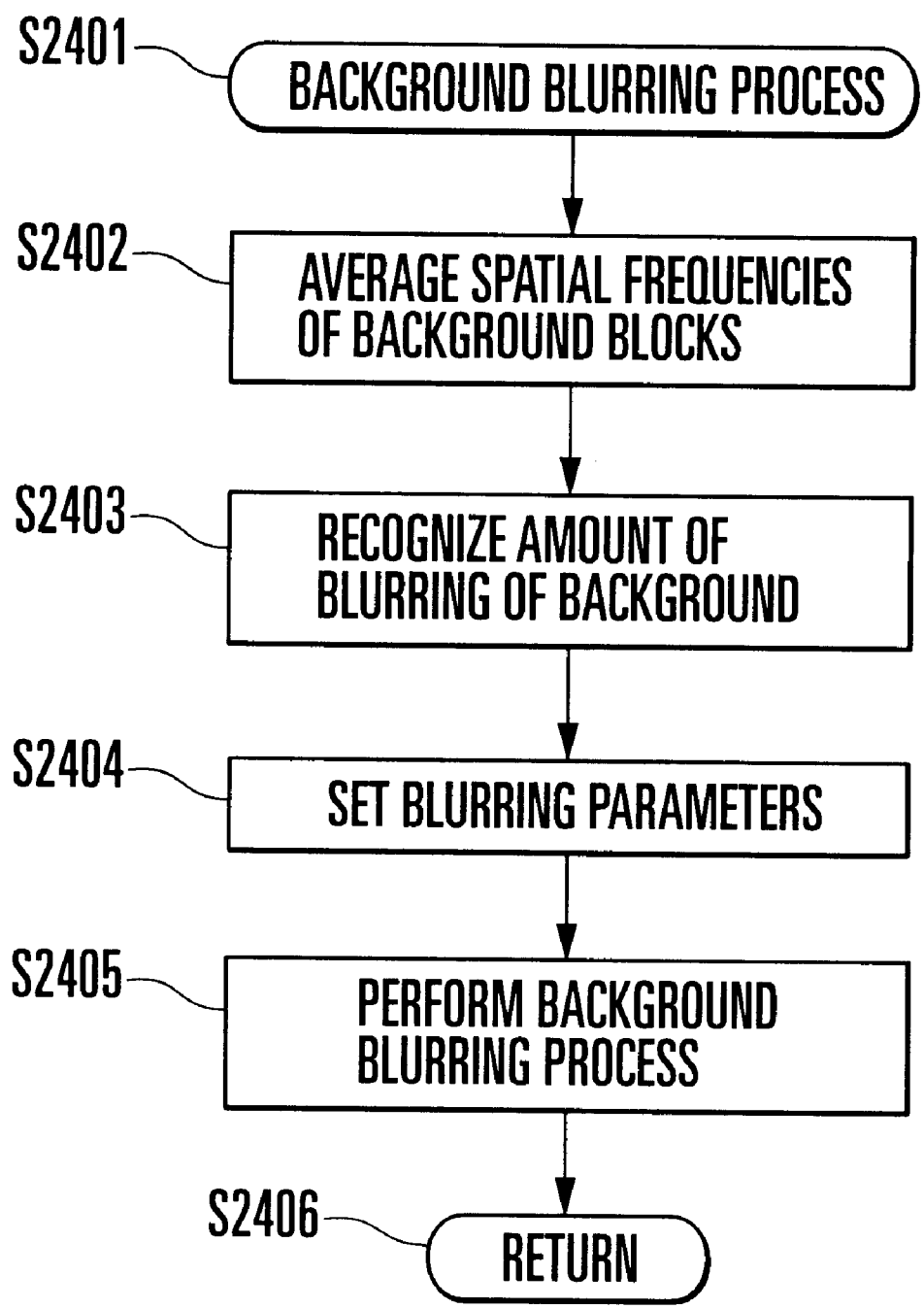
FIG. 27 is a flow chart illustrating a background blurring subroutine performed by the image reproducing apparatus according to the second embodiment of the invention.
Figures 28, 29:
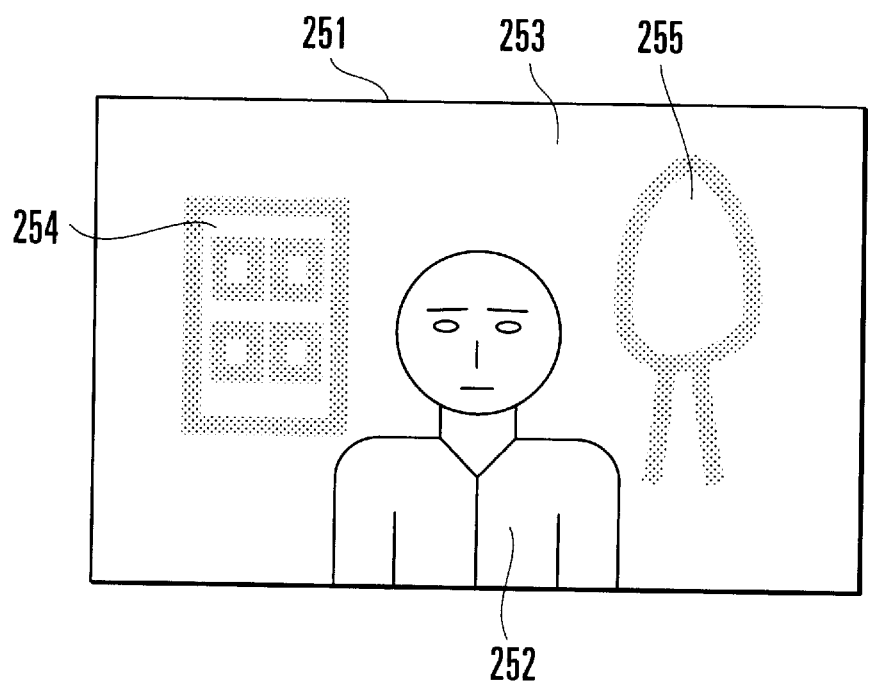
FIG. 28 is a schematic diagram illustrating an image processing filter used by the image reproducing apparatus according to the second embodiment of the invention.
FIG. 29 shows a final image obtained by means of the image processing performed by the image reproducing apparatus according to the second embodiment of the invention.

FIG. 27 is a control flow chart illustrating, in further detail, the background blurring subroutine performed in step S2216 shown in FIG. 23. FIG. 28 illustrates an image processing filter used in the background blurring subroutine.

In step S2402 after step 2401 in FIG. 27, a maximum spatial frequency associated with the background blocks is detected. More specifically, a maximum value of the spatial frequencies in two-dimensional directions associated with the background blocks extracted in steps S2302 to S2306 in FIG. 24 is determined.

In step S2403, the amount of blurring $\epsilon S$ of the background image is determined from the spatial frequencies of the background image calculated in step S2402. That is, in step S2403, the amount of blurring of the background image, which was set when the image was photographed as described above with reference to step S2117 in FIG. 20, is reproduced from the image according to an equation of "$\epsilon S = K4/SF2$", where K4 is a predetermined constant and SF2 is the maximum spatial frequency of the background image.

In step S2404, blurring parameters for the background image are determined. For example, when the amount of blurring produced in the actual photo-taking process is equal to 5 times the diameter (0.03 mm) of an allowable circle of confusion, that is, equal to 0.15 mm, if the amount of blurring is increased by a factor of 5, that is, to 0.75 mm, then a sufficient blurring effect for the background is achieved. FIG. 28 illustrates an image processing filter produced using the blurring parameters determined in the above-described manner.

In the specific example shown in FIG. 28, the blurring filter is represented by a "7×7" matrix. The order of the matrix (the numbers of rows and columns of the matrix) is set to the number of pixels corresponding to the amount of blurring (0.75 mm in this specific example).

In step S2405, the background image shown in FIG. 26 is processed using the matrix filter produced in step S2404 as shown in FIG. 28. Then, when the main object image, cut out in FIG. 25 and saved elsewhere, is embedded to the original location of the processed image, a final image is obtained as shown in FIG. 29.

After that, in step S2406, the process exits from the subroutine.

The operation of the camera for taking a picture and the image processing performed by the image reproducing apparatus have been described in detail above. The procedure from the start of taking a picture until an image is finally outputted is summarized below.

When the photographer wants to take a picture in the portrait mode, the photographer sets the photo-taking mode of the camera into the "PORTRAIT" mode as shown in FIG. 18 before taking a picture. In response, the camera 201 determines the aperture value from the three-dimensional information associated with the object detected by the focus detecting device so that a background image in the image plane is blurred by a predetermined amount. An exposure control program line is then determined as shown in FIG. 19.

An APEX calculation is then performed on the basis of the above exposure control program line, the object luminance and the film sensitivity, thereby determining the shutter speed and the aperture value, whereby an exposure of the film is properly controlled.

After completion of the exposure, the film is wound by an amount corresponding to one frame. During the film winding operation, photo-taking information, such as information indicating that the picture was taken in the portrait mode, information representing the main object location on the image plane determined on the basis of the detection of the visual line of the photographer and information representing other conditions, is recorded on the magnetic layer coated on the film.

After completion of the photo-taking operation, the photographer takes the film out of the camera and has the film developed at a photofinishing laboratory. After development, the film is subjected to the following process by an image reproducing apparatus possessed by the photographer himself/herself or at the photofinishing laboratory.

First, the cartridge containing the developed film is loaded on the film scanner, and optical information recorded on the film and photo-taking information recorded on the magnetic layer are read.

If the photo-taking information indicates that a picture was taken in the portrait mode, the spatial frequency analysis is performed on the picture image and image portions in focus and image portions out of focus are discriminated from each other. Taking further into account the main object location information recorded on the magnetic layer, a main object image is separated from a background image, thereby obtaining a background image signal such as that shown in FIG. 26.

A properly-selected blurring filter is then applied only to the background image. After that, the main object image saved without being subjected to the blurring process is embedded back into the background image. Thus, a final image is obtained as shown in FIG. 29. The image is then displayed on a monitor or printed on paper.

In the second embodiment, as described above, if the portrait mode is selected when a picture is taken, photography conditions are set so that a main object image falls within the depth of focus while a background image is blurred by a specified amount without causing the main object image to be blurred.

Because the background image in the photographed picture is blurred by the specified amount, the main object image can be precisely separated from the background image. This makes it possible to eliminate an error in the blurring enhancing process on the background image.

Furthermore, because photo-taking mode information employed when a picture is taken is recorded together with an image and is supplied to an image reproducing apparatus, the photographer can obtain a picture which has been subjected to desired image processing without having to perform a special operation or give a special order.

Furthermore, because information indicating the main object location on the image plane, inputted or detected when a picture was taken, is recorded together with an image and is supplied to an image reproducing apparatus, a main object can be precisely separated from a background, and thus it is possible to eliminate an error in a blurring enhancing process on the background image.

Furthermore, because image processing parameters are automatically determined depending on the frequency characteristic of a photographed image, the photographer can easily obtain a picture subjected to desired image processing without having to perform a special operation or give a special order.

In the first and second embodiments described above, the image recording apparatus uses a silver-halide film coated with a magnetic recording medium. The invention may also be applied, for the same purpose, to an image recording apparatus such as an electronic camera (also called a digital camera) which converts an optical image into an electric signal and records the resultant electric signal in a memory medium.

Furthermore, although in the first and second embodiments, the image reproducing apparatus outputs an image in the form of a photograph (printed on paper), an image may also be outputted using a display device. Also in this case, the apparatus falls within the scope of the present invention.

Furthermore, instead of outputting an image in the form of a photograph (printed on paper), image information may also be outputted from the image reproducing apparatus over a network. Also in this case, the apparatus falls within the scope of the present invention.

Third Embodiment

Figure 30:
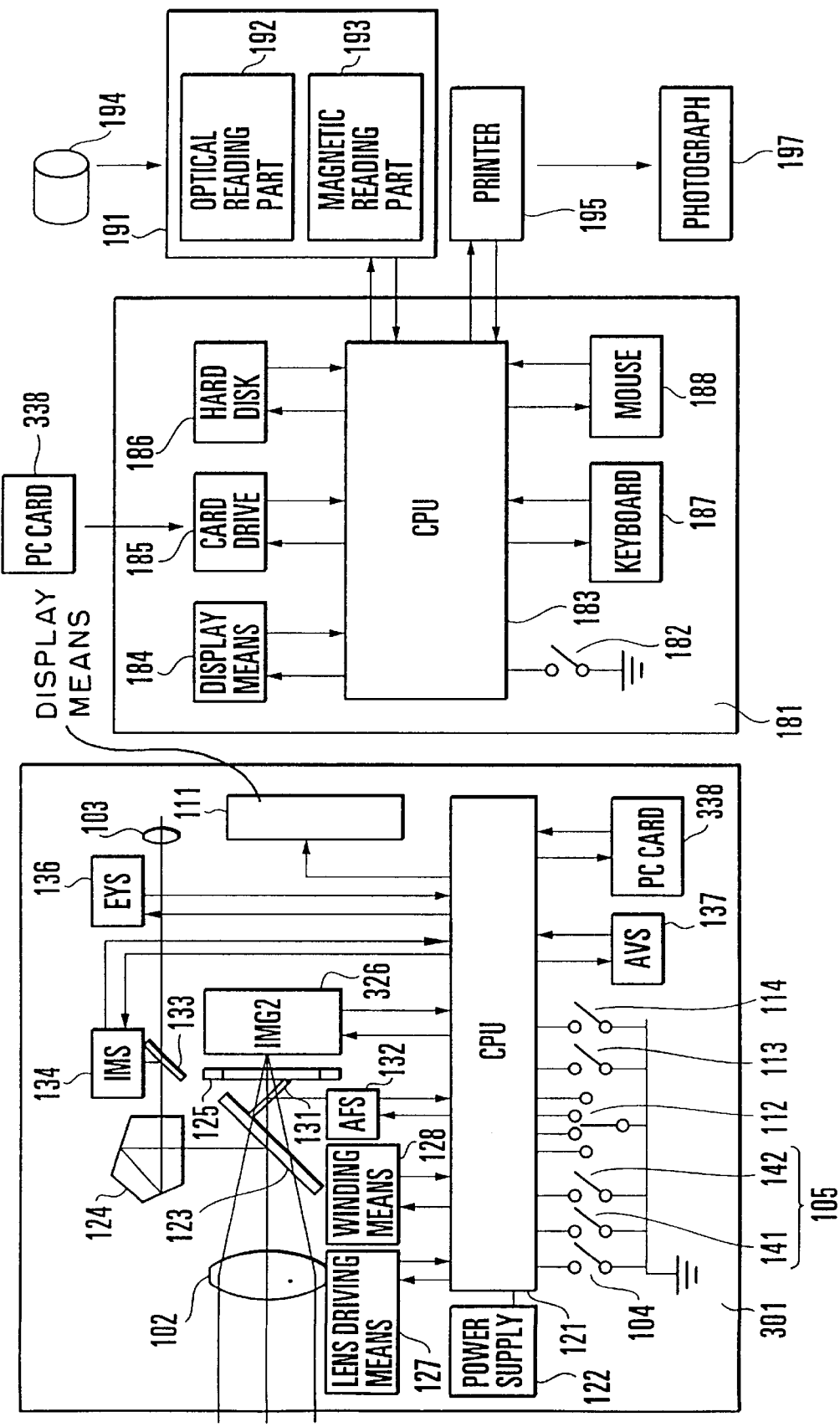
FIG. 30 is a schematic diagram illustrating the details of an image recording/reproducing system according to a third embodiment of the invention.

FIG. 30 illustrates a third embodiment of the invention. The third embodiment is different from the first embodiment shown in FIG. 2 in that the silver-halide film 126 is replaced with an image sensor 326 and the memory 138 is replaced with a card IC memory, such as a so-called PC card 338, removable from a camera, so that an electric signal representing a photographed image is stored in the PC card 338.

Furthermore, the magnetic signal recording means 135 used in the first embodiment to record photo-taking information on a film is removed in the case of the third embodiment, because photo-taking information is recorded together with an image signal in the PC card 338 serving as the image recording medium.

The operation of a camera 301 is substantially the same as that of the camera according to the first or second embodiment, and thus the operation of the camera 301 is not described in further detail here.

On the other hand, the image reproducing apparatus body 181 includes a PC card drive 185 for reading information from the PC card 338. As in the first and second embodiments in which an optical image is read from the film cartridge 194 and is processed, an image signal and photo-taking information stored in the PC card 338 may be read and subjected to image processing in a similar manner to that performed in the first or second embodiment, and the resultant image may be outputted.

As has been described in the foregoing, according to each of the embodiments disclosed, at the time of a photo-taking operation, a picture is taken under a particular photo-taking condition which creates a particular effect conforming to a picture-drawing intention of the photographer, and, at the time of image reproduction, image processing is performed so as to enhance the above effect conforming to the picture-drawing intention. Thus, it is possible to provide an image recording/reproducing system capable of acquiring a high-quality image with a particular effect conforming to the picture-drawing intention.

Furthermore, because it is possible to enhance a flowing shooting effect on a background in a picture taken in the flowing shooting mode, it becomes possible to obtain a sufficient flowing shooting effect even if a picture is taken at a higher shutter speed than employed in the conventional technique. This ensures that a picture with such an effect can be obtained without resulting in a failure.

Furthermore, because the shutter speed may be set such that a background image has an optimum amount of flowing, any photographer, even a beginner having no special skill for flowing shooting, may obtain a picture having a sufficient flowing shooting effect.

Furthermore, blurring enhancement may be performed on an image part such as a background image located at a different distance from other image parts so as to produce a picture with a sufficiently blurred background.

Still furthermore, the location of a main object image may be easily inputted by means of the visual-line detecting means, so that the photographer can concentrate on an operation for taking a picture.

Still furthermore, the photographer can easily confirm using a display whether or not a picture has been taken in a desired fashion, immediately after taking the picture. Therefore, when a picture in a desired fashion is not obtained, the photographer can easily determine whether or not to take a picture again.

Furthermore, at the time of a photo-taking operation, a picture is taken under a particular photo-taking condition which creates a particular effect conforming to a picture-drawing intention of the photographer, and, at the time of image reproduction, image processing is performed so as to enhance the above effect conforming to the picture-drawing intention. Thus, it is possible to provide an image recording apparatus in an image recording/reproducing system capable of acquiring a high-quality image with a particular effect conforming to the picture-drawing intention.

Still furthermore, at the time of a photo-taking operation, a picture is taken under a particular photo-taking condition which creates a particular effect conforming to a picture-drawing intention of the photographer, and, at the time of image reproduction, image processing is performed so as to enhance the above effect conforming to the picture-drawing intention. Thus, it is possible to provide an image reproducing apparatus in an image recording/reproducing system capable of acquiring a high-quality image with a particular effect conforming to the picture-drawing intention.

What is claimed is:

1. An image recording/reproducing system, comprising an image recording apparatus for recording an image on a recording medium and an image reproducing apparatus for reproducing the image by using the recording medium having the image recorded by said image recording apparatus, said image recording apparatus comprising:
   photo-taking mode selecting means;
   photo-taking condition setting means for setting a predetermined photo-taking condition in accordance with the photo-taking mode selected by said photo-taking mode selecting means;
   photo-taking mode recording means for recording selected photo-taking mode information on said recording medium, and
said image reproducing apparatus comprising:
   recognizing means for recognizing a first area as an image object area and a second area as the others of said image; and
   filtering means for performing filtering processing to transform at least a part of said image,
   wherein said filtering means includes control means for controlling to apply said filtering means for said first area and said second area of said image differently on the basis of said photo-taking mode information.

2. An image recording/reproducing system according to claim 1, wherein a particular mode able to be selected by said photo-taking mode selecting means causes the photo-taking condition to be set such that an amount of image shake relatively moving with regard to photo-taking means included in said image recording apparatus becomes equal to or more than a predetermined value, and wherein said image processing means performs spatial-frequency lowering processing on an image having an amount of image shake equal to or more than the predetermined value in accordance with the photo-taking mode information.

3. An image recording/reproducing system according to claim 2, wherein said photo-taking condition setting means sets, as the photo-taking condition, such an exposure period of time as to cause an amount of image shake equal to or more than the predetermined value to occur in a background image obtained when performing a photo-taking operation while tracking a moving photo-taking object.

4. An image recording/reproducing system according to claim 3, wherein said photo-taking condition setting means sets the photo-taking condition using also an output of vibration detecting means for detecting movement of said photo-taking means of said image recording apparatus.

5. An image recording/reproducing system according to claim 1, wherein a particular mode able to be selected by said photo-taking mode selecting means causes the photo-taking condition to be set such that a predetermined blurring effect is given to a second photo-taking area which differs in distance from a first photo-taking area, and further comprising image processing means for performing spatial frequency lowering processing on the second photo-taking area in accordance with the photo-taking mode information.

6. An image recording/reproducing system according to claim 5, wherein said photo-taking condition setting means sets, as the photo-taking condition, such an aperture value as to cause a predetermined amount of blurring to occur in the second photo-taking area.

7. An image recording/reproducing system according to claim 1, wherein said image recording apparatus further comprises location selecting means for selecting a particular location within the image and records, as the photo-taking mode information, a result of selection by said location selecting means on the recording medium, and wherein said image reproducing apparatus divides the image into a plurality of areas including a first area and a second area on the basis of the result of selection recorded on the recording medium and performs processing which differs between the first area and the second area.

8. An image recording/reproducing system according to claim 7, wherein said location selecting means includes visual-line direction detecting means for detecting a fixation direction of an operator of said image recording/reproducing apparatus.

9. An image recording/reproducing system according to claim 1, wherein said image recording apparatus further comprises image display means for displaying an image taken in the photo-taking condition set by said photo-taking condition setting means.

10. An image recording/reproducing system according to claim 2, wherein said image recording apparatus further comprises image display means for displaying an image taken in the photo-taking condition set by said photo-taking condition setting means.

11. An image recording/reproducing system according to claim 3, wherein said image recording apparatus further comprises image display means for displaying an image taken in the photo-taking condition set by said photo-taking condition setting means.

12. An image recording/reproducing system according to claim 5, wherein said image recording apparatus further comprises image display means for displaying an image taken in the photo-taking condition set by said photo-taking condition setting means.

13. An image recording/reproducing system according to claim 7, wherein said image recording apparatus further comprises image display means for displaying an image taken in the photo-taking condition set by said photo-taking condition setting means.

14. An image recording apparatus for use in an image recording/reproducing system comprising said image recording apparatus for recording an image on a recording medium and an image reproducing apparatus for reproducing the image by using the recording medium having the image recorded by said image recording apparatus, said image recording apparatus comprising:

photo-taking mode selecting means;

photo-taking condition setting means for setting a predetermined photo-taking condition in accordance with the photo-taking mode selected by said photo-taking mode selecting means; and photo-taking mode recording means for recording selected photo-taking mode information on said recording medium, and said image reproducing apparatus including:

recognizing means for recognizing a first area as an image object area and a second area as the others of said image; and filtering means for performing filtering processing to transform at least a part of said image, wherein said filtering means includes control means for controlling to apply said filtering means for said first area and said second area of said image differently on the basis of said photo-taking mode information.

15. An image reproducing apparatus for use in an image recording/reproducing system comprising an image recording apparatus including photo-taking mode selecting means, photo-taking condition setting means for settings a predetermined photo-taking condition in accordance with the photo-taking mode selected by said photo-taking mode selecting means, and recording means for recording an image and selected photo-taking mode information on a recording medium, and said image reproducing apparatus for reproducing the image by using the recording medium having the image recorded by said image recording apparatus, said image reproducing apparatus comprising:

recognizing means for recognizing a first area as an image object area and a second area as the others of said image; and filtering means for performing filtering processing to transform at least a part of said image, wherein said filtering means includes control means for controlling to apply said filtering means for said first area and said second area of said image differently on the basis of said photo-taking mode information.

16. An image recording apparatus according to claim 14, wherein a particular mode able to be selected by said photo-taking mode selecting means causes the photo-taking condition to be set such that an amount of image shake relatively moving with regard to photo-taking means included in said image recording apparatus becomes equal to or more than a predetermined value.

17. An image recording apparatus according to claim 14, wherein said photo-taking condition setting means sets, as the photo-taking condition, such an exposure period of time as to cause an amount of image shake equal to or more than the predetermined value to occur in a background image obtained when performing a photo-taking operation while tracking a moving photo-taking object.

18. An image recording apparatus according to claim 14, wherein a particular mode able to be selected by said photo-taking mode selecting means causes the photo-taking condition to be set such that a predetermined blurring effect is given to a second photo-taking area which differs in distance from a first photo-taking area.

19. An image recording apparatus according to claim 14, wherein said image recording apparatus further comprises location selecting means for selecting a particular location within the image and records, as the photo-taking mode information, a result of selection by said location selecting means on the recording medium.

20. An image recording apparatus according to claim 14, wherein said image recording apparatus further comprises image display means for displaying an image taken in the photo-taking condition set by said photo-taking condition setting means.

21. An image reproducing apparatus according to claim 15, further comprising image processing means for performing a spatial-frequency lowering process as a blurring effect.

22. An image reproducing apparatus according to claim 15, further comprising image processing means for dividing the image into a plurality of areas and performing processing which differs between the plurality of areas.

23. An image reproducing apparatus comprising:

a reader for reading out an image and a photo-taking condition from a recording medium;

a recognizer for recognizing a first area as an image object area and a second area as the others of said image; and a filter for performing filtering processing to transform at least a part of said image, wherein said filter includes a controller for controlling to apply said filter for said first area and said second area of said image differently on the basis of said photo-taking condition.

24. An image reproducing apparatus according to claim 23, wherein said filtering processing is the processing for blurring said image.

25. An image reproducing apparatus according to claim 23, wherein said controller blurs said second area.

26. An image reproducing apparatus according to claim 23, further comprising a printer for printing an image controlled by said controller.

27. An image reproducing apparatus according to claim 23, wherein said controller applies filtering for one of said first area and said second area and does not apply it for the other area.

28. An image recording/reproducing system according to claim 1, wherein said control means applies filtering for one of said first area and said second area and does not apply it for the other area.

29. A control method of an image recording/reproducing system, comprising an image recording apparatus for recording an image on a recording medium and an image reproducing apparatus for reproducing the image by using the recording medium having the image recorded by said image recording apparatus, in said image recording apparatus, comprising:

a photo-taking mode selecting process;

a photo-taking condition setting process for setting a predetermined photo-taking condition in accordance with the photo-taking mode selected in said photo-taking mode selecting process;

a photo-taking recording process for recording selected photo-taking mode information on said recording medium, and in said image reproducing apparatus, comprising:

a recognizing process for recognizing a first area as an image object area and a second area as the others of said image; and a filtering process for performing filtering processing to transform at least a part of said image, in said filtering process, further including a control process for controlling to apply said filtering process for said first area and said second area of said image differently on the basis of said photo-taking mode information.

30. A control method of an image recording/reproducing system according to claim 29, wherein said control process is to apply filtering for one of said first area and said second area and not to apply it for the other area.

31. An image reproducing method comprising:

a reading process for reading out an image and photo-taking condition from a recording medium;

a recognizing process for recognizing a first area as an image object area and a second area as the others of said image; and a filtering process for performing filtering processing to transform at least a part of said image, in said filtering process, including a control process for controlling to apply said filtering process for said first area and said second area of said image differently on the basis of said photo-taking condition.

32. A computer readable recording medium, which records a program for executing processes in an image reproducing apparatus, comprising:

reading out an image and a photo-taking condition from the recording medium;

recognizing a first area as an image object area and a second area as the others of said image; and performing filtering processing to transform at least a part of said image, in said filtering processing, including control processing to apply said filtering processing for said first area and said second area of said image differently on the basis of said photo-taking condition.

33. A control method of an image recording apparatus for use in an image recording/reproducing system comprising said image recording apparatus for recording an image on a recording medium and an image reproducing apparatus for reproducing the image by using the recording medium having the image recorded by said image recording apparatus, in said image recording apparatus, comprising:

a photo-taking mode selecting process;

a photo-taking condition setting process for setting a predetermined photo-taking condition in accordance with the photo-taking mode selected in said photo-taking mode selecting process; and a photo-taking mode recording process for recording selected photo-taking mode information on said recording medium, and in said image reproducing apparatus, including:

a recognizing process for recognizing a first area as an image object area and a second area as the others of said image; and a filtering process for performing filtering processing to transform at least a part of said image, in said filtering process, further including a control process for controlling to apply said filtering process for said first area and said second area of said image differently on the basis of said photo-taking mode information.

34. A computer readable recording medium, which records a program for executing processes in an image recording apparatus for use in image recording/reproducing system comprising said image recording apparatus for recording an image on the recording medium and image reproducing apparatus for reproducing the image by using the recording medium having the image recorded by said images recording apparatus, in the image recording apparatus, the processes comprising:

selecting a photo-taking mode;

setting a predetermined photo-taking condition in accordance with the selected photo-taking mode; and recording selected photo-taking mode information on the recording medium, and in said image reproducing apparatus, the processes comprising:

recognizing a first area as an image object area and a second area as the others of said image; and filtering processing to transform at least a part of said image, in said filtering processing, including controlling to apply said filtering process for said first area and said second area of said image differently on the basis of said photo-taking mode information.

35. A control method of an image reproducing apparatus for use in an image recording/reproducing system comprising an image recording apparatus including photo-taking mode selecting means, photo-taking condition setting means for setting a predetermined photo-taking condition in accordance with the photo-taking mode selected by said photo-taking mode information on a recording medium, and said image reproducing apparatus for reproducing the image by using the recording medium having the image recorded by said image recording apparatus, in said image reproducing apparatus comprising:

a recognizing process for recognizing a first area as an image object area and a second area as the others of said image; and a filtering process for performing filtering processing to transform at least a part of said image, in said filtering process, further including a control process for controlling to apply said filtering process for said first area and said second area of said image differently on the basis of said photo-taking mode information.

36. A computer readable recording medium, which records a program for executing processes in an image reproducing apparatus for use in an image recording/reproducing system comprising an image reproducing apparatus including photo-taking mode selecting means, phototaking condition setting means for setting a predetermined photo-taking condition in accordance with the photo-taking mode selected by said photo-taking mode selecting means, and recording means for recording an image and selected photo-taking mode information on a recording medium, and said image reproducing apparatus for reproducing the image by using the recording medium having the image recorded by said image recording apparatus, in said image reproducing apparatus, said processes comprising:

recognizing a first area as an image object area and a second area as the others of said image; and performing filtering processing to transform at least a part of said image, in said filtering processing, including controlling to apply said filtering processing for said first area and said second area of said image differently on the basis of said photo-taking mode information.

* * * * *

UNITED STATES PATENT AND TRADEMARK OFFICE
CERTIFICATE OF CORRECTION

PATENT NO. : 6,556,784 B1
DATED : April 29, 2003
INVENTOR(S) : Ichiro Onuki

It is certified that error appears in the above-identified patent and that said Letters Patent is hereby corrected as shown below:

Column 17,
Line 16, delete ""F=DEFEAX/∈/K2"" and insert -- F=DEFMAX/∈/ K2" --.

Signed and Sealed this

Ninth Day of December, 2003

JAMES E. ROGAN
*Director of the United States Patent and Trademark Office*